United States Patent [19]
Ohki et al.

[11] Patent Number: 5,177,608
[45] Date of Patent: Jan. 5, 1993

[54] METHOD AND APPARATUS FOR CODING MOVING IMAGE SIGNAL

[75] Inventors: Junichi Ohki; Eri Murata, both of Tokyo, Japan

[73] Assignee: NEC Corporation, Tokyo, Japan

[21] Appl. No.: 764,606

[22] Filed: Sep. 20, 1991

[30] Foreign Application Priority Data

| Sep. 20, 1990 | [JP] | Japan | 2-252905 |
| Sep. 20, 1990 | [JP] | Japan | 2-252906 |
| Sep. 20, 1990 | [JP] | Japan | 2-252907 |
| Sep. 28, 1990 | [JP] | Japan | 2-261379 |
| Oct. 5, 1990 | [JP] | Japan | 2-268649 |
| Oct. 5, 1990 | [JP] | Japan | 2-268975 |
| Oct. 5, 1990 | [JP] | Japan | 2-268976 |
| Oct. 5, 1990 | [JP] | Japan | 2-268977 |
| Oct. 5, 1990 | [JP] | Japan | 2-268978 |
| Mar. 15, 1991 | [JP] | Japan | 3-50926 |

[51] Int. Cl.$^5$ .............................................. H04N 7/13
[52] U.S. Cl. ...................................... 358/136; 358/135
[58] Field of Search ................ 358/136, 105, 133, 135

[56] References Cited

U.S. PATENT DOCUMENTS

| 4,792,851 | 12/1988 | Mochizaki | 358/136 |
| 4,809,067 | 2/1989 | Kikachi et al. | 358/136 X |
| 4,876,595 | 10/1989 | Veldhuis | 358/136 |
| 4,996,594 | 2/1991 | Murayama | 358/136 |

OTHER PUBLICATIONS

Kenshi Dachiku et al., "A Color Motlon Videophone for the ISDN", National conference in Spring-Time of the Institute of Electronics Information and Communication Engineers (1989), pp. 7–215.

*Primary Examiner*—Victor R. Kostak
*Attorney, Agent, or Firm*—Sughrue, Mion, Zinn, Macpeak & Seas

[57] ABSTRACT

According to a method and apparatus for coding a moving image signal, a change between a current frame and a previous frame is detected in units of blocks obtained by dividing a frame constituted by an input moving image signal into a plurality of pixels. A first valid block map is formed in units of frames by determining valid and invalid blocks on the basis of the detected changes. A first weighting operation of the formed first valid block map is performed. A second weighting operation of a fourth valid block map of the previous frame is performed. A weighted second valid block map is obtained by adding/synthesizing the first and fourth valid block maps respectively subjected to the first and second weighting operations. A third valid block map is obtained by performing predetermined segmentation of the second valid block map. A fourth valid block map is obtained by determining validity of an isolated invalid block in the third valid block map by referring to neighboring blocks. A valid block region of the fourth valid block map is coded.

30 Claims, 27 Drawing Sheets

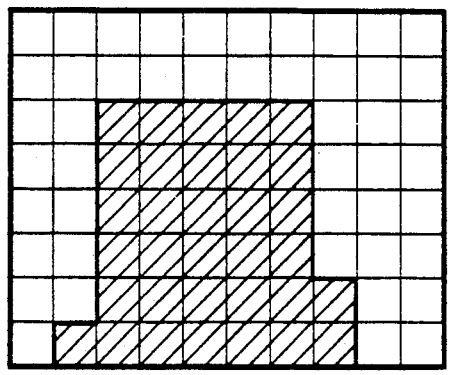
F I G. 3A
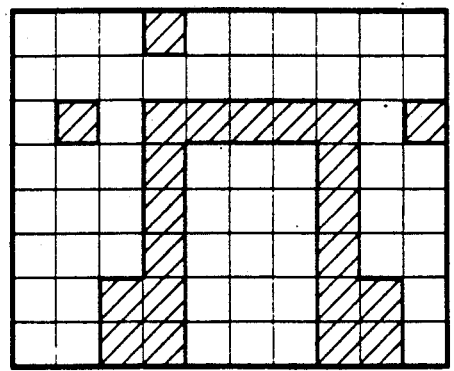
F I G. 3B
| 0 | 0 | 0 | 2 | 0 | 0 | 0 | 0 | 0 |
|---|---|---|---|---|---|---|---|---|
| 0 | 0 | 0 | 0 | 0 | 0 | 0 | 0 | 0 |
| 0 | 2 | 1 | 3 | 3 | 3 | 2 | 0 | 2 |
| 0 | 0 | 1 | 3 | 1 | 1 | 2 | 0 | 0 |
| 0 | 0 | 1 | 3 | 1 | 1 | 2 | 0 | 0 |
| 0 | 0 | 1 | 3 | 1 | 1 | 2 | 0 | 0 |
| 0 | 0 | 3 | 3 | 1 | 1 | 3 | 2 | 0 |
| 0 | 1 | 3 | 3 | 1 | 1 | 3 | 2 | 0 |
F I G. 4A
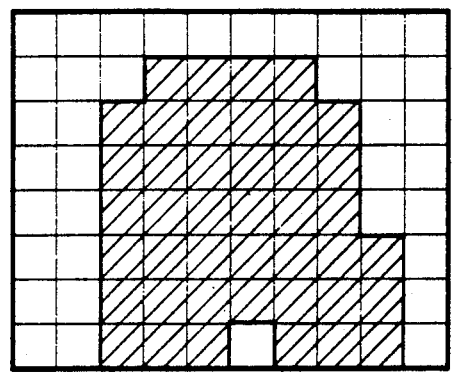
F I G. 4B
| a | b | c |
|---|---|---|
| d | k | e |
| f | g | h |
F I G. 5
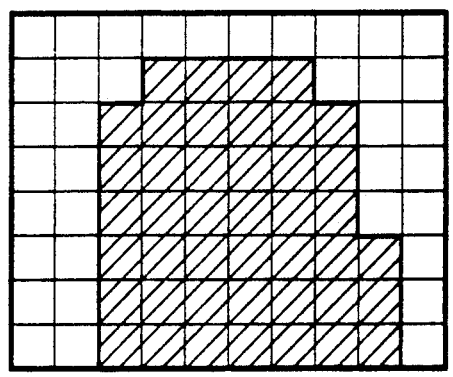
F I G. 6

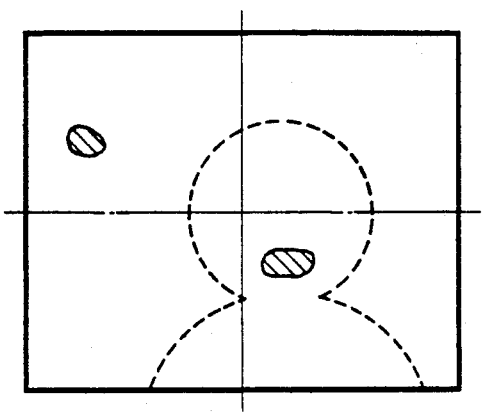
FIG.8A
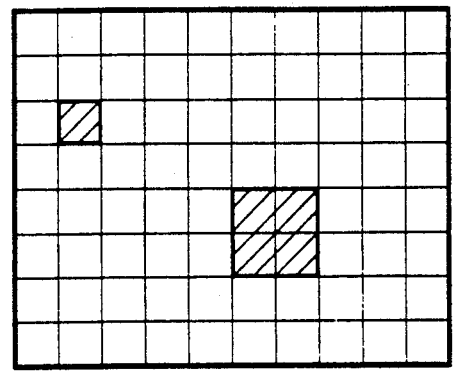
FIG.8B
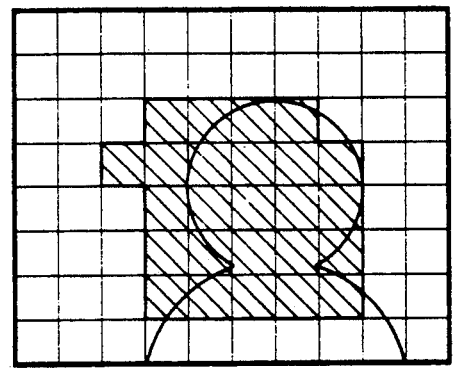
| 0 | 0 | 0 | 0 | 0 | 0 | 0 | 0 | 0 |
|---|---|---|---|---|---|---|---|---|
| 0 | 0 | 0 | 1 | 1 | 1 | 1 | 0 | 0 |
| 0 | 2 | 1 | 1 | 1 | 1 | 1 | 0 | 0 |
| 0 | 0 | 1 | 1 | 1 | 1 | 1 | 1 | 0 |
| 0 | 0 | 1 | 1 | 1 | 3 | 3 | 1 | 0 |
| 0 | 0 | 1 | 1 | 1 | 3 | 3 | 1 | 0 |
| 0 | 0 | 1 | 1 | 1 | 1 | 1 | 1 | 0 |
| 0 | 0 | 1 | 1 | 1 | 1 | 1 | 1 | 0 |
FIG.9A
FIG.9B
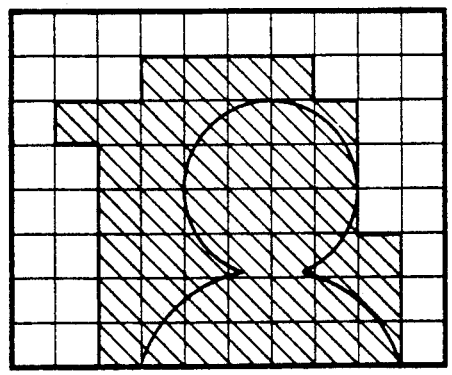
FIG.10

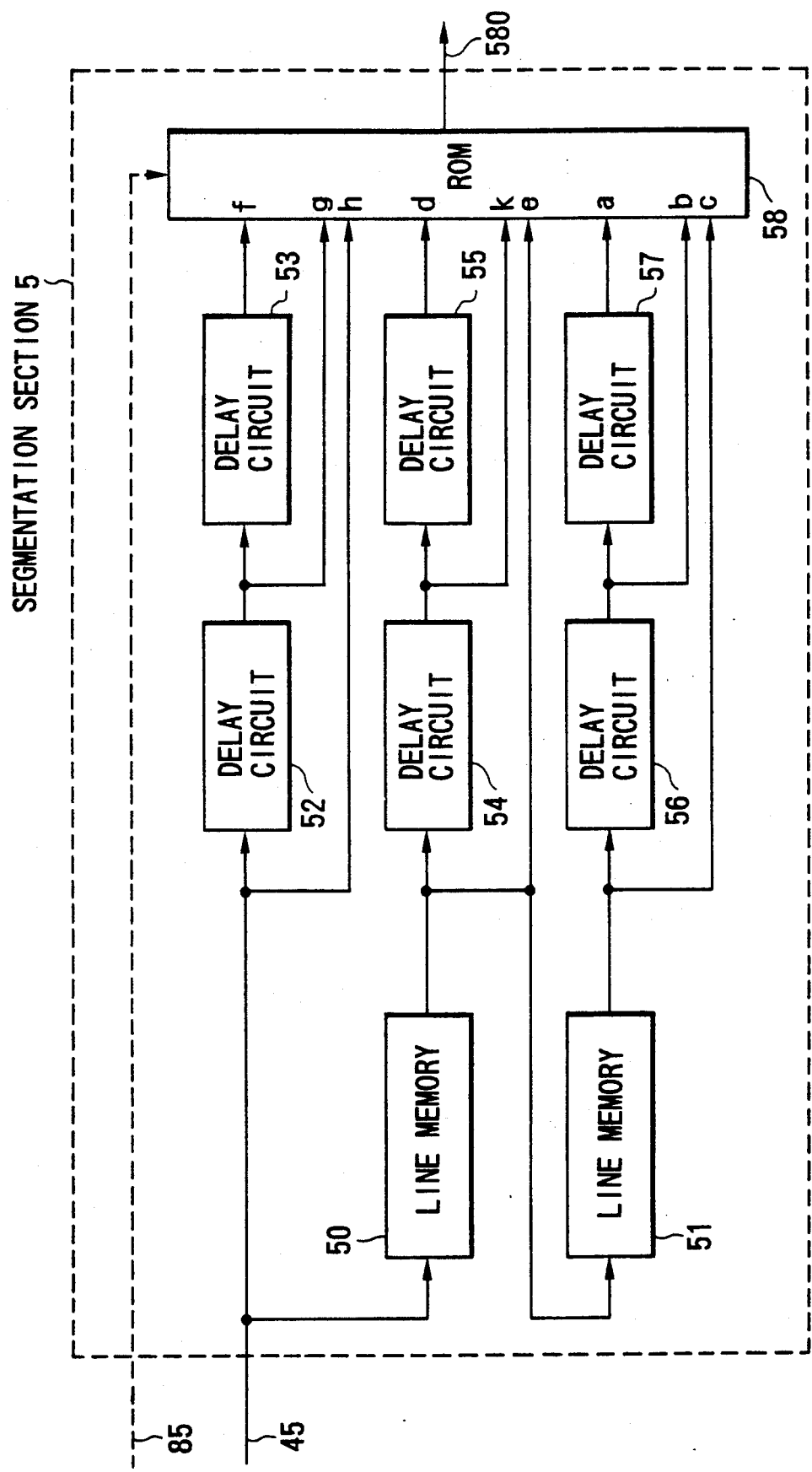
F I G. 12

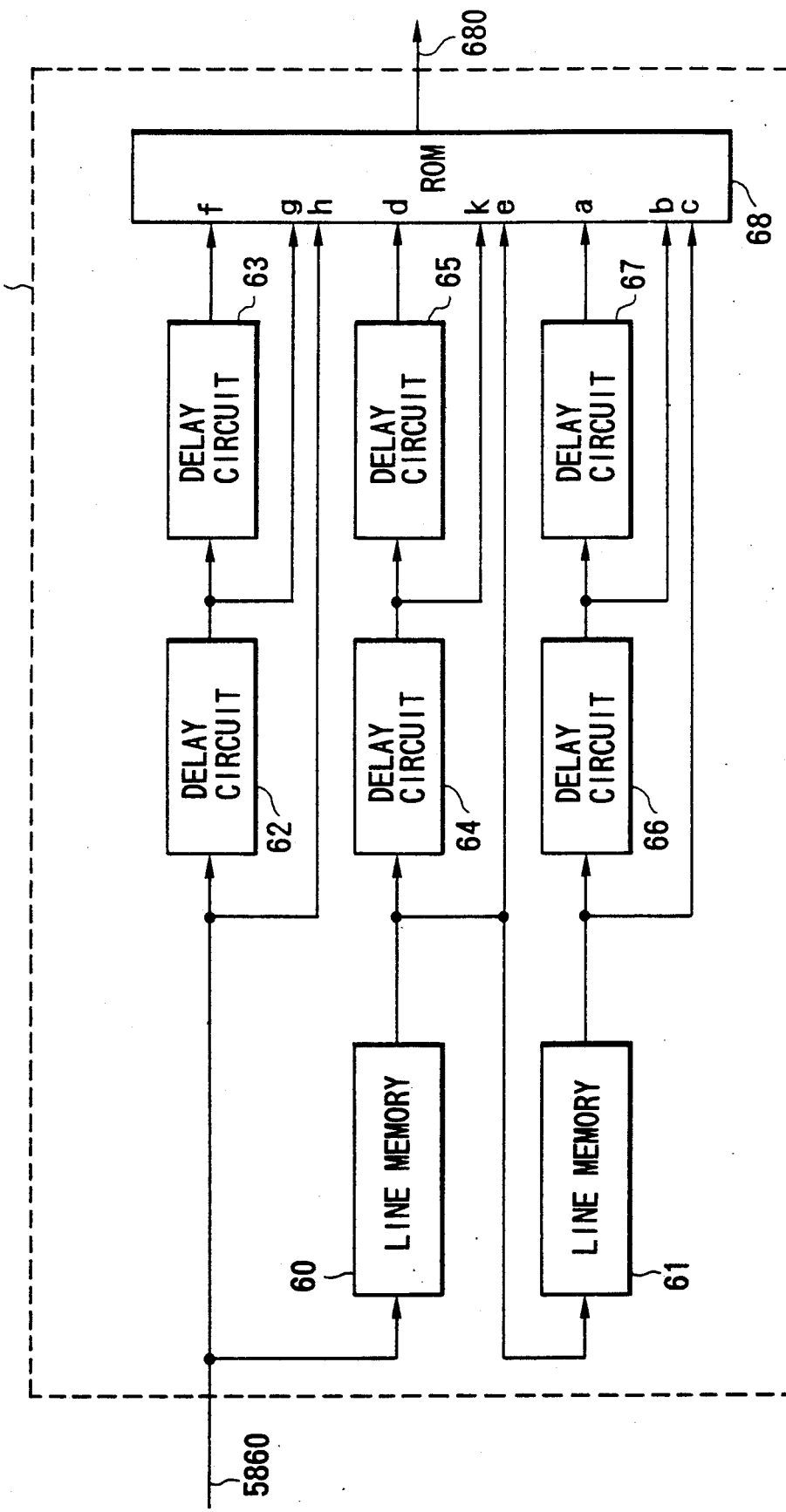
F I G. 13

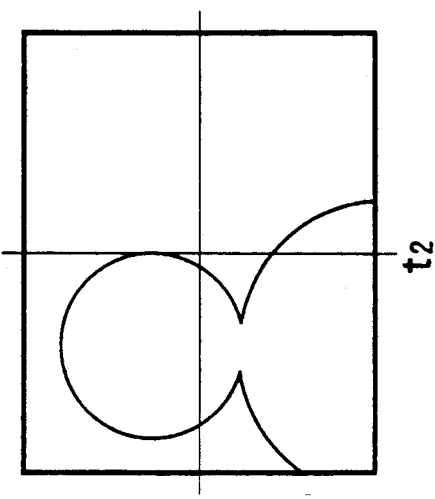
$t_2$
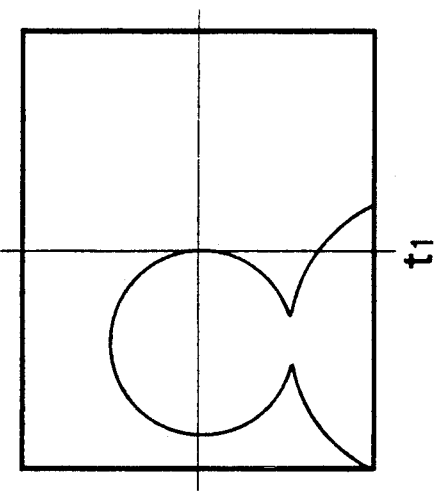
$t_1$
FIG. 15
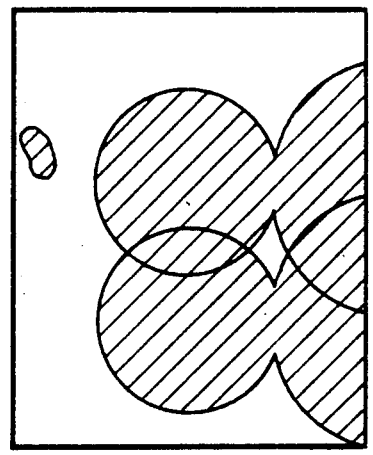
FIG. 16
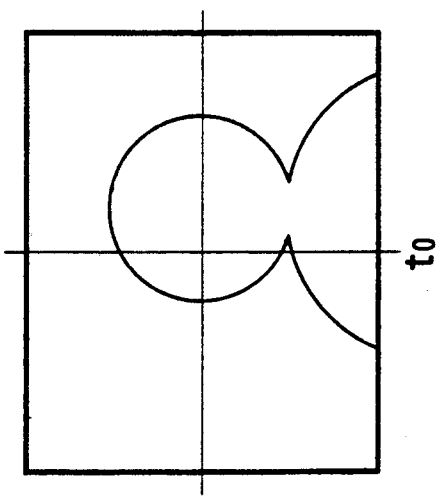
$t_0$

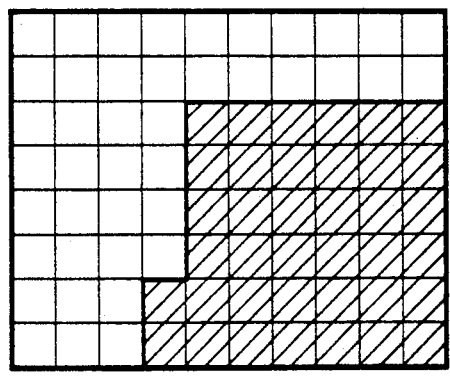
FIG. 17A
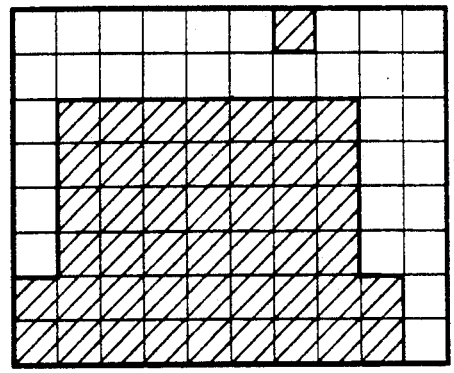
FIG. 17B
| 0 | 0 | 0 | 0 | 0 | 0 | 2 | 0 | 0 |
|---|---|---|---|---|---|---|---|---|
| 0 | 0 | 0 | 0 | 0 | 0 | 0 | 0 | 0 |
| 0 | 2 | 2 | 2 | 3 | 3 | 3 | 1 | 1 |
| 0 | 2 | 2 | 2 | 3 | 3 | 3 | 1 | 1 |
| 0 | 2 | 2 | 2 | 3 | 3 | 3 | 1 | 1 |
| 0 | 2 | 2 | 2 | 3 | 3 | 3 | 1 | 1 |
| 2 | 2 | 2 | 2 | 3 | 3 | 3 | 3 | 1 |
| 2 | 2 | 2 | 2 | 3 | 3 | 3 | 3 | 1 |
FIG. 17C
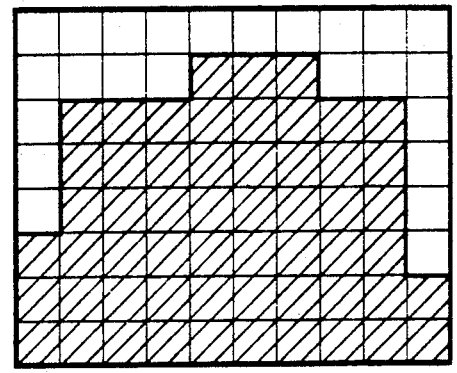
FIG. 17D
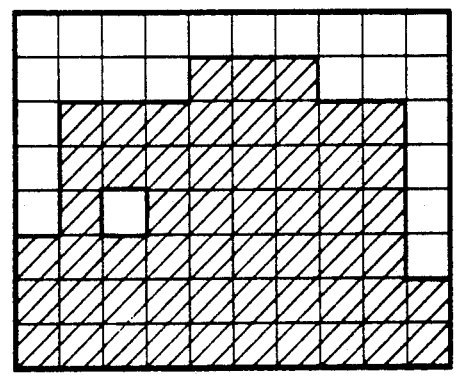
FIG. 18

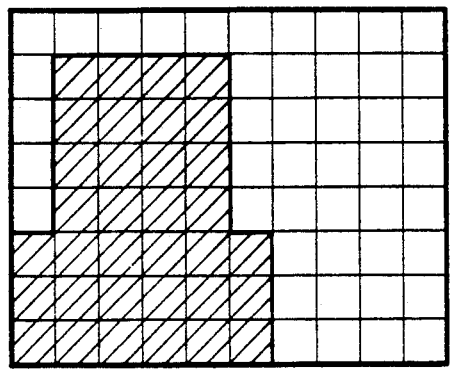
F I G. 19A    F I G. 19B
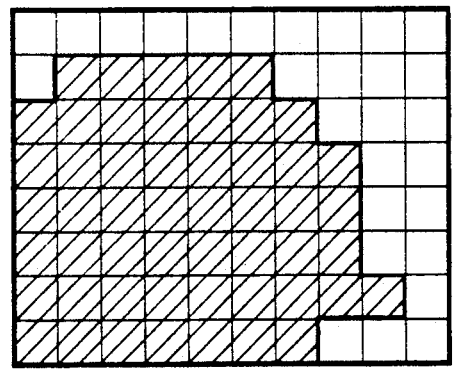
F I G. 19C    F I G. 19D

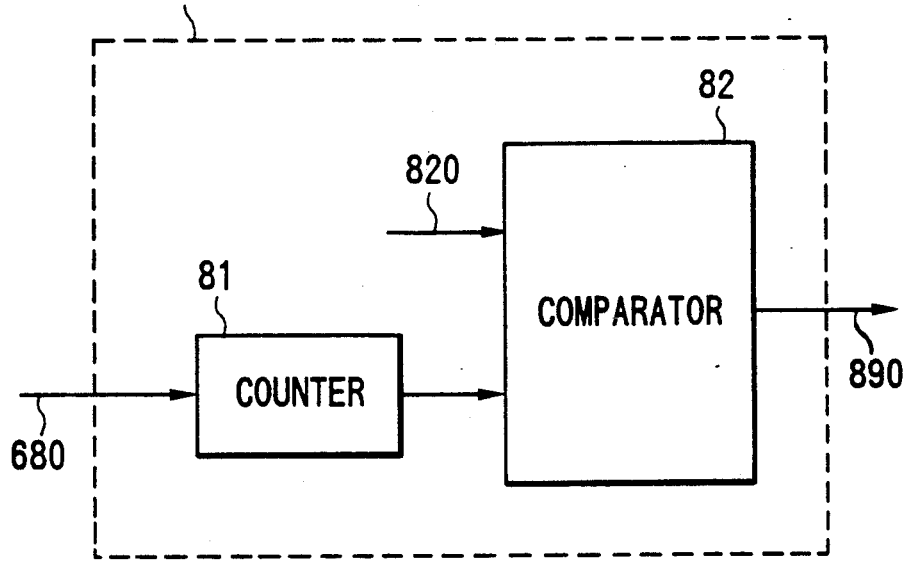
F I G. 21
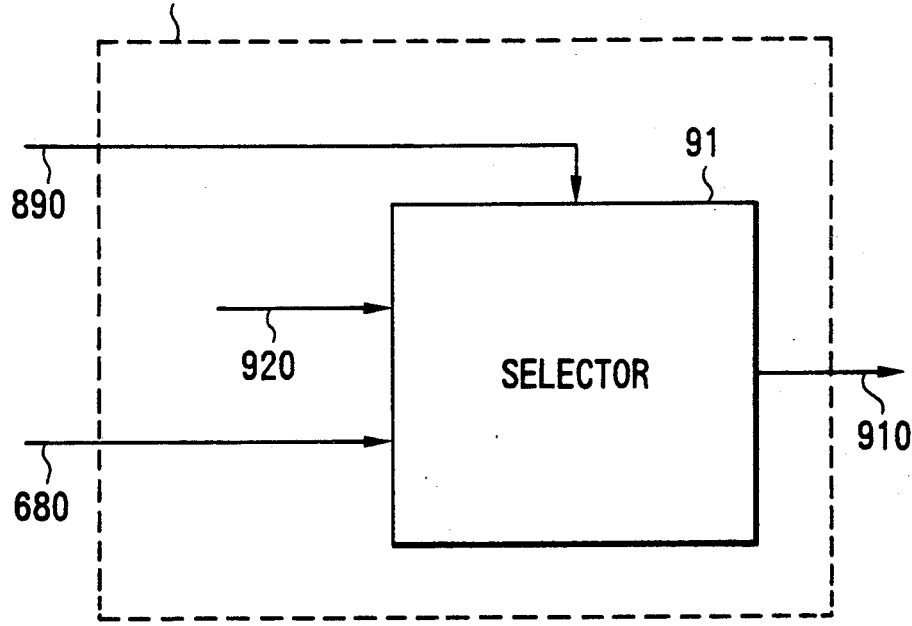
F I G. 22

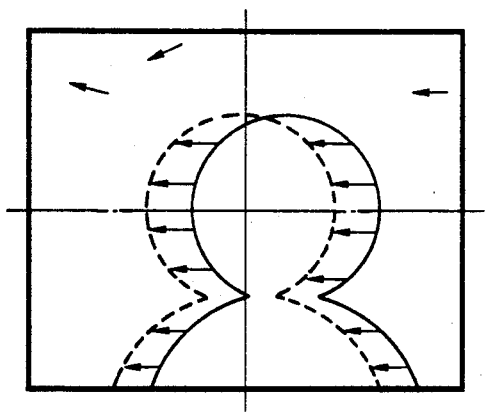
FIG. 24
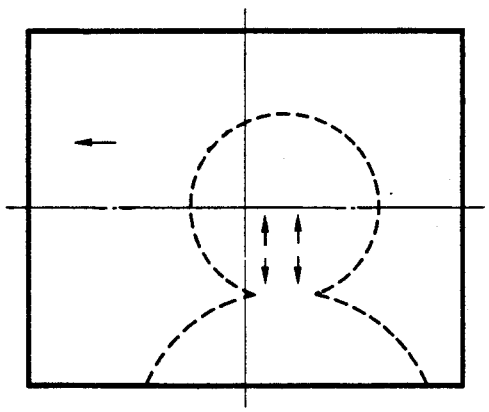
FIG. 25A
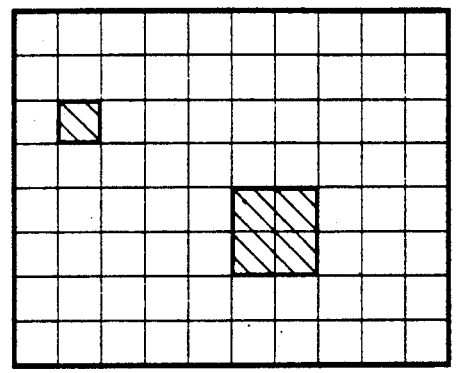
FIG. 25B
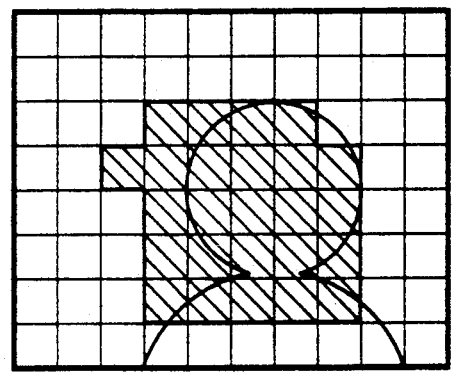
FIG. 26A
FIG. 26B

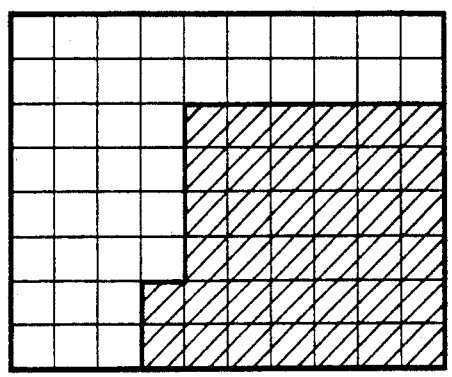
FIG.29A
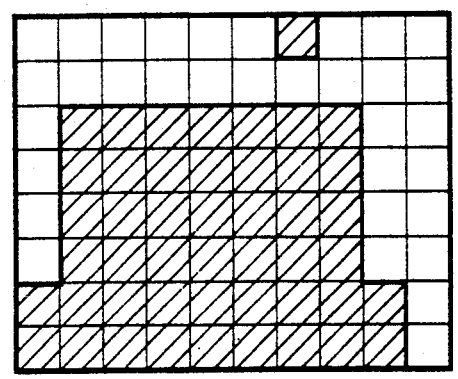
FIG.29B
| 0 | 0 | 0 | 0 | 0 | 0 | 2 | 0 | 0 | 0 |
|---|---|---|---|---|---|---|---|---|---|
| 0 | 0 | 0 | 0 | 0 | 0 | 0 | 0 | 0 | 0 |
| 0 | 2 | 2 | 2 | 3 | 3 | 3 | 3 | 1 | 1 |
| 0 | 2 | 2 | 2 | 3 | 3 | 3 | 3 | 1 | 1 |
| 0 | 2 | 2 | 2 | 3 | 3 | 3 | 3 | 1 | 1 |
| 0 | 2 | 2 | 2 | 3 | 3 | 3 | 3 | 1 | 1 |
| 2 | 2 | 2 | 3 | 3 | 3 | 3 | 3 | 3 | 1 |
| 2 | 2 | 2 | 3 | 3 | 3 | 3 | 3 | 3 | 1 |
FIG.29C
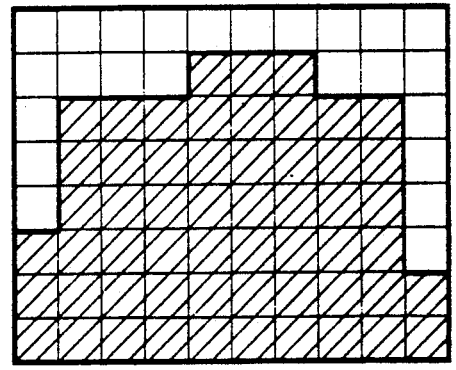
FIG.29D

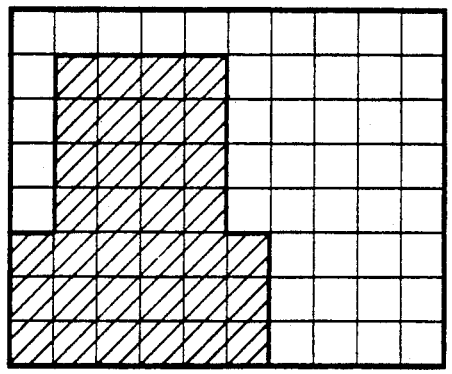
F I G. 31A　　　F I G. 31B
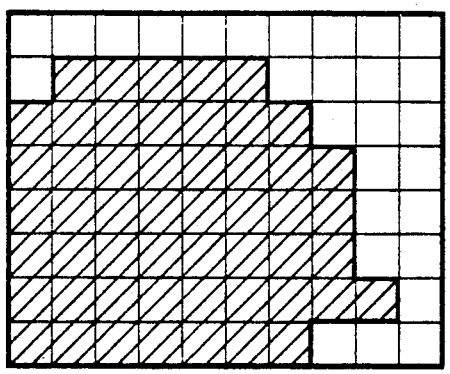
F I G. 31C　　　F I G. 31D

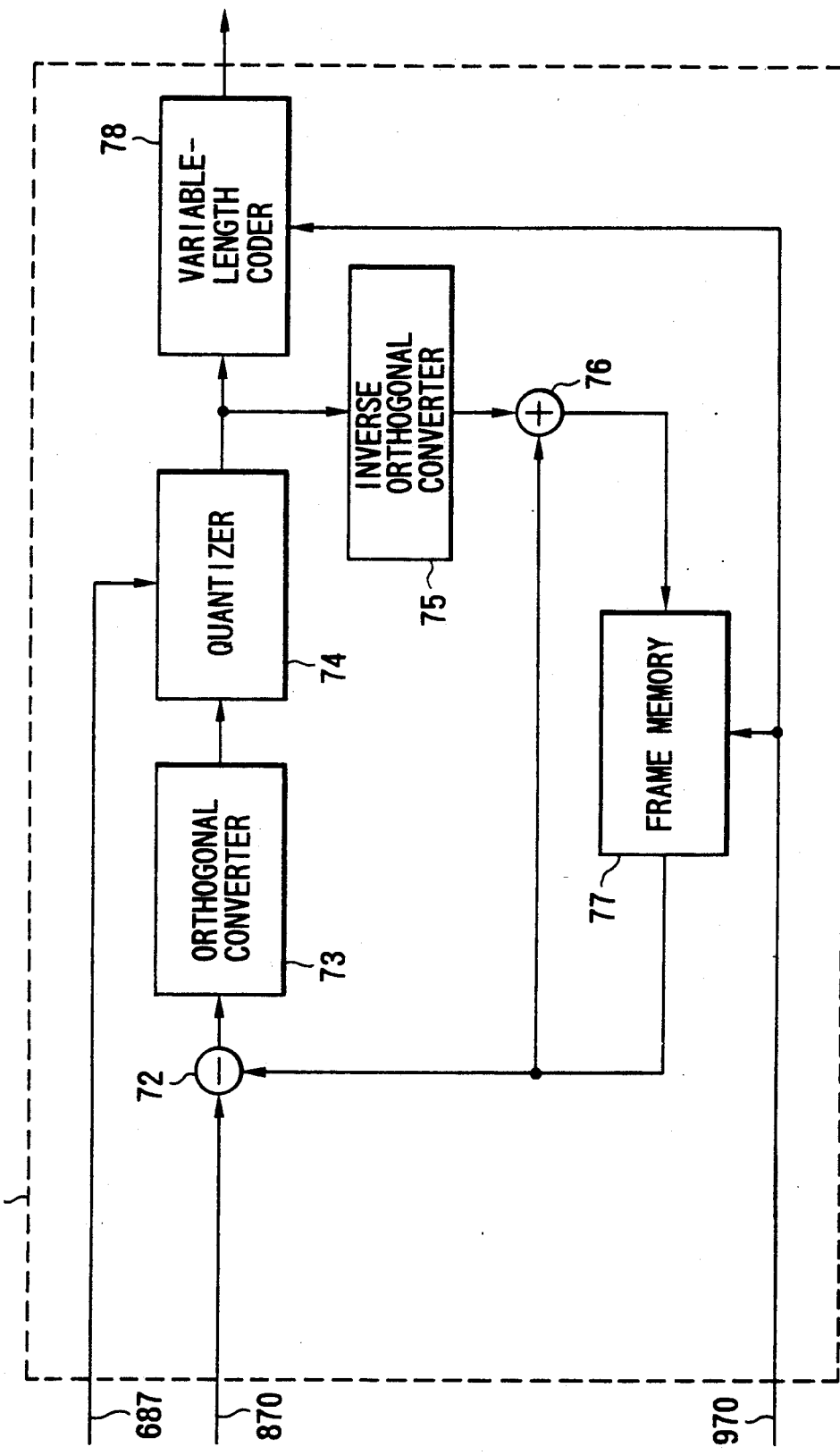
F I G. 36

METHOD AND APPARATUS FOR CODING MOVING IMAGE SIGNAL

BACKGROUND THE INVENTION

The present invention relates to a method and apparatus for coding a moving image signal by using a band compression technique.

As a conventional scheme for coding a moving image signal by using a band compression technique, for example, a scheme described in "Color Moving Image Videophone Compatible with ISDN", Spring National Convention of the Institute of Electronics and Communication Engineers of Japan, Reference No. D-233, 1989 is known. In this scheme for coding a moving image signal, a face region is extracted from a frame to form a map. In an image coding section, inter-frame and intra-frame adaptive prediction operations are performed. In this case, if a face region is determined, coding is performed to the last step. Otherwise, coding is stopped in a step immediately preceding the last step to reduce the coding amount.

In the above-described conventional scheme for coding a moving image signal, however, since a background portion other than a face portion is coarsely coded, unnecessary information is generated because of noise in the background portion. In addition, if a background portion is changed to a face portion between continuous frames, since a coarsely coded portion is changed to a finely coded portion, a large number of predictive error signals are inevitably generated. That is, unnecessary information is coded. As a result, the coding efficiency is decreased.

SUMMARY OF THE INVENTION

It is an object of the present invention to provide a method and apparatus for coding a moving image signal, which can improve the coding efficiency It is another object of the present invention to provide a method and apparatus for coding a moving image signal, which can remove unnecessary information generated by noise in a background portion.

It is still another object of the present invention to provide a method and apparatus for coding a moving image signal, which codes only a speaker region.

In order to achieve the above objects, according to an aspect of the present invention, there is provided a method of coding a moving image signal, comprising the steps of detecting a change between a current frame and a previous frame in units of blocks obtained by dividing a frame constituted by an input moving image signal into a plurality of pixels, forming a first valid block map in units of frames by determining valid and invalid blocks on the basis of the detected changes, performing a first weighting operation of the formed first valid block map, performing a second weighting operation of a fourth valid block map of the previous frame, obtaining a weighted second valid block map by adding/synthesizing the first and fourth valid block maps respectively subjected to the first and second weighting operations, obtaining a third valid block map by performing predetermined segmentation of the second valid block map, obtaining a fourth valid block map by determining validity of an isolated invalid block in the third valid block map by referring to neighboring blocks, and coding a valid block region of the fourth valid block map.

According to another aspect of the present invention, there is provided an apparatus for coding a moving image signal, comprising forming means for detecting a change between a current frame and a previous frame in units of blocks obtained by dividing a frame constituted by an input moving image signal into a plurality of pixels, and forming a first valid block map in units of frames by determining valid and invalid blocks on the basis of the detected changes, first weighting means for performing a first weighting operation of the formed first valid block map, second weighting means for performing a second weighting operation of a fourth valid block map of the previous frame, adding means for obtaining a weighted second valid block map by adding/synthesizing outputs from the first and second weighting means, segmentation means for obtaining a third valid block map by performing predetermined segmentation of the second valid block map, isolated invalid block removing means for obtaining a fourth valid block map by determining validity of an isolated invalid block output from the segmentation means by referring to neighboring blocks, and coding means for coding a valid block region output from the isolated invalid block removing means.

In a videophone and the like, while a background portion remains stationary, a speaker mainly moves. Therefore, if a speaker portion is extracted and subjected to coding, unnecessary information generated by noise in the background and the like can be removed, and the coding efficiency can be improved.

In the present invention, the differences between frames are detected, and segmentation (linkage and removal of motion regions) is performed with respect to each portion corresponding to the difference equal to or larger than a predetermined value, thus improving the coding efficiency. A method of extracting a speaker region by a difference detection scheme according to an embodiment of the present invention will be described in detail below with reference to the accompanying drawings. Assume that a speaker moves as indicated by the frames at time t0, time t1, and time t2 in FIG. 1. In addition, assume that when the differences between the frames at time t1 and time t2, the shaded portions shown in FIG. 2 are obtained, and that the isolated shaded portions in the background portion correspond to difference signals generated by noise in the background. Subsequently, each frame is divided into a plurality of blocks, each consisting of n horizontal pixels × n vertical pixels. If the sum of the absolute values of difference signals in each block is equal to or larger than the first threshold value, the corresponding block is defined as a valid block. If the sum of the absolute values of the difference signals is less than the first threshold value, the corresponding block is defined as an invalid block. The first valid block map obtained by the above-described processing is shown in FIG. 3B. The shaded portions in FIG. 3B are valid blocks. Assume that FIG. 3A shows the fourth valid block map obtained between the frames at time t0 and time t1. The first and second weighting operations of the valid block map of the current frame, i.e., the first valid block map and the valid block map of the previous frame, i.e., the fourth valid block map are respectively performed. An example of weighting will be described below. For example, valid and invalid blocks of the previous frame are respectively represented by "1" and "0". A valid block of the current frame is represented by "2", and an invalid block thereof is represented by "0", similar to an invalid block of the previous frame. The second valid block map is obtained by adding/synthesizing the weighted valid block maps of the previous and current frames. FIG. 4A shows the second valid block map. Subsequently, segmentation of the second valid block map obtained by the above adding/synthesizing operation is performed. An example of segmentation will be described below with reference to 4A to 5. Assume that a block k in FIG. 5 is a target segmentation block. In this case, the values of blocks a, b, c, d, e, f, g, and h adjacent to the block k are referred. More specifically, the value of the second valid block map shown in FIG. 4A is referred. If the values of the neighboring blocks a, b, c, d, e, f, g, and h are equal to or larger than a predetermined second threshold value, the target block k is regarded as a valid block. If the values of the neighboring blocks a, b, c, d, e, f, g, and h are less than a predetermined second threshold value, the target block k is regarded as an invalid block.

The third valid block map newly obtained by segmentation is shown in FIG. 4B. An isolated invalid block x is sometimes formed in the third valid block map. In this case, if coding of only the valid block region in the third valid block map is executed, the isolated invalid block x in the valid block region is not coded. As a result, coding distortion occurs in the invalid block x, and the resulting coded image greatly deteriorates. For this reason, removal of the isolated invalid block x is performed. In a method of removing the isolated invalid block x, processing similar to segmentation of an isolated invalid block is performed. More specifically, the values of blocks adjacent to the isolated invalid block x are referred. If the values of the neighboring blocks are equal to or larger than a predetermined threshold value, the isolated invalid block x as a target is replaced with a value representing a valid block. With the above-described processing, the region of the isolated invalid block x in FIG. 4B is removed to obtain the fourth valid block map. FIG. 6 shows the fourth valid block map. Subsequently, a portion, of the input moving image signal, which corresponds to the valid block region in FIG. 6, i.e., the speaker region, is coded by using either or both of inter-frame correlation and intra-frame correlation. With this operation, unnecessary information generated by noise in the background and the like can be easily removed, and the coding efficiency can be improved.

As the above-mentioned threshold values and the values for weighting, statistically obtained optimal values are used. In addition, the arrangement and number of reference pixels in segmentation and isolated invalid block removing operation are not limited to those described above.

BRIEF DESCRIPTION OF THE DRAWINGS

FIGS. 1 to 6 are views showing a method of coding a moving image signal according to an embodiment of the present invention;

FIGS. 8 to 10 are views showing a method of coding a moving image signal according to another embodiment of the present invention;

FIGS. 12 to 14 are block diagrams respectively showing a segmentation section, an isolate invalid block removing section, and a coding section;

FIGS. 15 to 19D are views for explaining a method of coding a moving image signal according to still another embodiment of the present invention;

FIGS. 21 and 22 are block diagrams respectively showing a valid block count determining section and a valid block reset section;

FIGS. 24 to 31D are views for explaining a method of coding a moving image signal according to still another embodiment of the present invention;

FIG. 36 is a block diagram showing another arrangement of the coding section.

DESCRIPTION OF THE PREFERRED EMBODIMENTS

Figure 7:
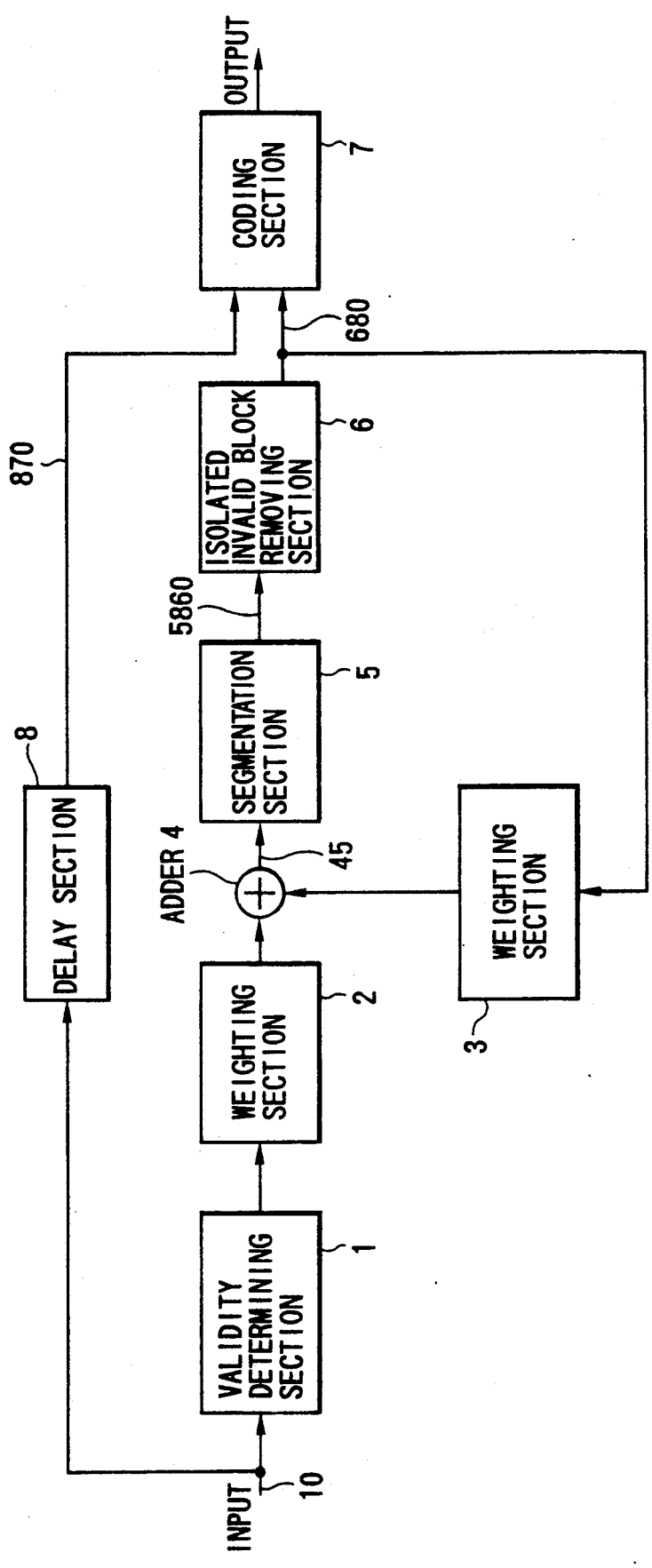
FIG. 7 is a block diagram showing an apparatus for coding a moving image signal according to the embodiment shown in FIGS. 1 to 6.

An apparatus based on a difference detection scheme according to an embodiment of the present invention will be described below with reference to the accompanying drawings. FIG. 7 shows an embodiment of the present invention. An input moving image signal is supplied to a validity determining section 1 and a delay section 8 through a line 10. The validity detecting section 1 stores a moving image signal of a previous frame, and obtains a frame difference signal based on the difference between the moving image signal of the previous frame and the new moving image signal input through the line 10. In addition, the validity detecting section 10 divides this frame difference signal into blocks, each consisting of a plurality of pixels, i.e., n horizontal pixels×n vertical pixels, and obtains the sum of the absolute values of frame difference values in each block. If the obtained sum of the absolute frame difference values in a give block is equal to or larger than a first threshold value, it is determined that the block is valid. If the sum of the absolute frame difference values in a given block is less than the first threshold value, it is determined that the block is invalid. In this manner, the validity determining section 1 obtains a first valid block map. The first valid block map obtained by the validity determining section 1 is supplied to a weighting section 2. The weighting section 2 performs a predetermined first weighting operation of the first valid block map supplied from the validity determining section 1. The first valid block map weighted by the weighting section 2 is supplied to an adder 4. The adder 4 adds the first valid block map supplied from the weighting section 2 to a fourth valid block map, of the previous frame, supplied from a weighting section 3, thus obtaining a second valid block map. The second valid block map obtained by the adder 4 is supplied to a segmentation section 5. The segmentation section 5 performs segmentation processing of all the blocks in the second valid block map supplied from the adder 4. Assume that a block k is a target block for segmentation, as shown in FIG. 5. In this case, the values of the block k and neighboring blocks a, b, c, d, e, f, g, and h are referred. If these values are equal to or larger than a second predetermined threshold value, it is determined that the block k is valid. If the values are less than the second threshold value, it is determined that the block k is invalid. In this manner, the segmentation section 5 obtains a third valid block map. The third valid block map obtained by the segmentation section 5 is supplied to an isolated invalid block removing section 6. The isolated invalid block removing section 6 performs an isolated invalid block removing operation of invalid blocks included in the third valid block map, and links the valid blocks with each other. In processing for isolated invalid blocks, similar to segmentation processing, blocks near an isolated invalid block as a target are referred. If the values of the neighboring blocks are equal to or larger than a third predetermined threshold value, it is determined that the isolated invalid block is a valid block. If the values of the neighboring blocks are less than the third threshold value, it is determined that the isolated invalid block is an invalid block. With the above-described operation, a fourth valid block map from which isolated invalid blocks are removed is obtained. The fourth valid block map obtained by the isolated invalid block removing section 6 is supplied to the weighting section 3 and a coding section 7. The weighting section 3 performs a second weighting operation of the fourth valid block map supplied from the isolated invalid block removing section 6, and supplies the weighted fourth valid block map to the adder 4. A delay section 8 performs delay time compensation of the input moving image signal by an amount corresponding to the time interval between the instant at which the input moving image signal is supplied to the delay section 8 and the instant at which the fourth valid block map is supplied to the coding section 7, thus synchronizing the fourth valid block map with the input moving image signal. The time-compensated moving image signal output from the delay section 8 is supplied to the coding section 7. The coding section 7 codes a portion, of the moving image signal supplied from the delay section 8, which corresponds to a valid block region, i.e., a speaker region, in the fourth valid block map supplied from the isolated invalid block removing section 6, but does not code a background portion indicated by invalid blocks.

As a coding method, one of the following methods is used: a method of using inter-frame correlation, e.g., motion compensation, a method of using intra-frame correlation, e.g., orthogonal conversion, and a method of using both inter-frame correlation and intra-frame correlation.

As the above-mentioned threshold values, statistically obtained optimal values are used.

Figure 2:
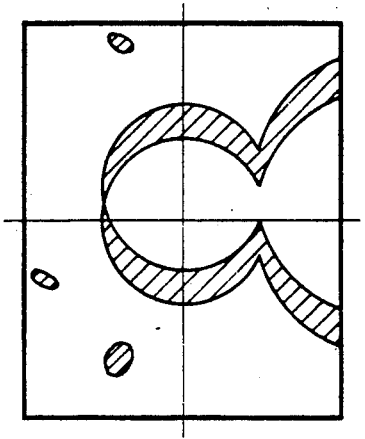
Figure 1:
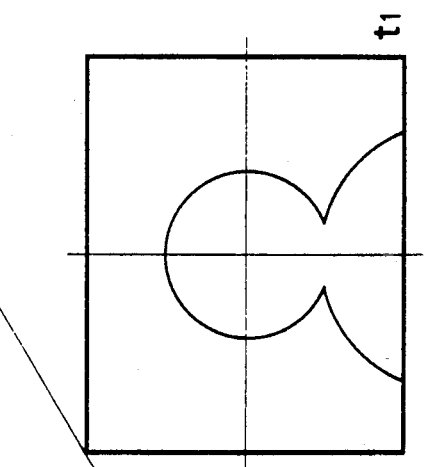
Figure 1:
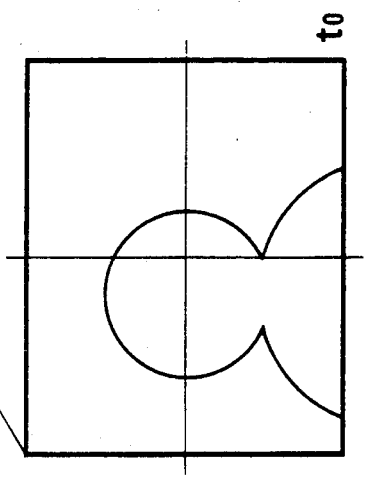

A method of extracting a speaker portion using the difference detection scheme according to another embodiment will be described next with reference to the accompanying drawings. This method employs a segmentation method different from that in the above-described method. Assume that after a speaker moves, as indicated by the frames at time t0, time t1, and time t2 in FIG. 1, and the speaker stops his/her motion but moves only his/her mouth. In this case, if the differences between the frames at time t1 and time t2 are obtained, hatched regions in FIG. 2 are obtained. The differences between the frames at time t2 and time t3 correspond to hatched regions in FIG. 8A. Assume that the isolated hatched portion in the background portion is a difference signal generated by noise in the background.

FIG. 8B shows a valid block map between time t2 and time t3, which is obtained by comparing a first threshold value with the sum of the absolute values of each difference signal. Referring to FIG. 8B, shaded portions indicate valid blocks.

A case will be described below, in which segmentation based on the method of this embodiment is performed with respect to a second valid block map shown in FIG. 4A which is obtained by an adding/synthesizing operation. If the ratio of a valid block count as a denominator in the fourth valid block map as a previous frame to a valid block count as a numerator in the first valid block as a current frame is equal to or larger than a fourth predetermined threshold value, e.g., if the valid block count of the current frame is substantially equal to or ½ or more the valid block count of the previous frame, the fourth valid block is obtained by the segmentation method described with reference to FIGS. 4A to 5.

Assume that the ratio of the valid block count of the previous frame to the valid block count of the current frame is less than the fourth threshold value, and the valid block count of the current frame is much smaller than the valid block count of the previous frame, similar to the case at time t3, e.g., less than ½. Segmentation processing in this case will be described below with reference to FIGS. 6, 8, 9, and 10. When the first and second weighting operations of the fourth valid block map obtained at time t2 in FIG. 6 and the first valid block map at time t2 in FIG. 8B are respectively performed, and the resulting maps are synthesized with each other, the second block map shown in FIG. 9A is obtained. When segmentation of the second valid block map is performed on the basis of the second threshold value, a third valid block map indicated by a hatched portion in FIG. 9B is obtained. Isolated invalid blocks are removed from the third valid block map on the basis of the third threshold value to obtain a fourth valid block map. In this case, since no isolated invalid blocks are present in the third valid block map obtained at time t3, the fourth valid block map is equivalent to the third valid block map. Subsequently, coding is performed with respect to only a portion, of the input moving image signal, which corresponds to the valid block region in the fourth valid block map. However, since the chest portion and upper right portion of the head of the speaker are omitted from the valid block region of the fourth valid block map, if coding is performed in this state, non-coded regions are generated in the chest portion and the head portion. As a result, discontinuous portions are formed in the speaker region of a coded image, and the coded image may deteriorate. If, therefore, the ratio of the valid block count of the previous frame to the valid block count of the current frame is less than the fourth threshold value, and the valid block count of the current frame is small, similar to the case at time t3, omissions from the speaker region are prevented by switching the threshold value in segmentation to another value. Assume that segmentation is executed in the weighted second valid block map shown in FIG. 9A. In this case, if, for example, the block k in FIG. 5 has a value other than "0", the threshold value is set to be small enough to make the block k as a segmentation target block valid, thus obtaining the third valid block shown in FIG. 10 and preventing omissions from the speaker region. The threshold value in this case is defined as a fifth threshold value. As described above, if the ratio of the valid block count of the previous frame to the valid block count of the current frame is equal to or larger than the fourth threshold value, segmentation based on the second threshold value is performed. If this ratio is smaller than the fourth threshold value, and the valid block count of the current frame is much smaller than that in the previous frame, segmentation based on the fifth threshold value is performed. Subsequently, coding of the input moving image signal corresponding to the valid block region, i.e., the speaker region, shown in FIG. 6 or 10, is performed by using either or both of inter-frame correlation and intra-frame correlation.

Figure 11:
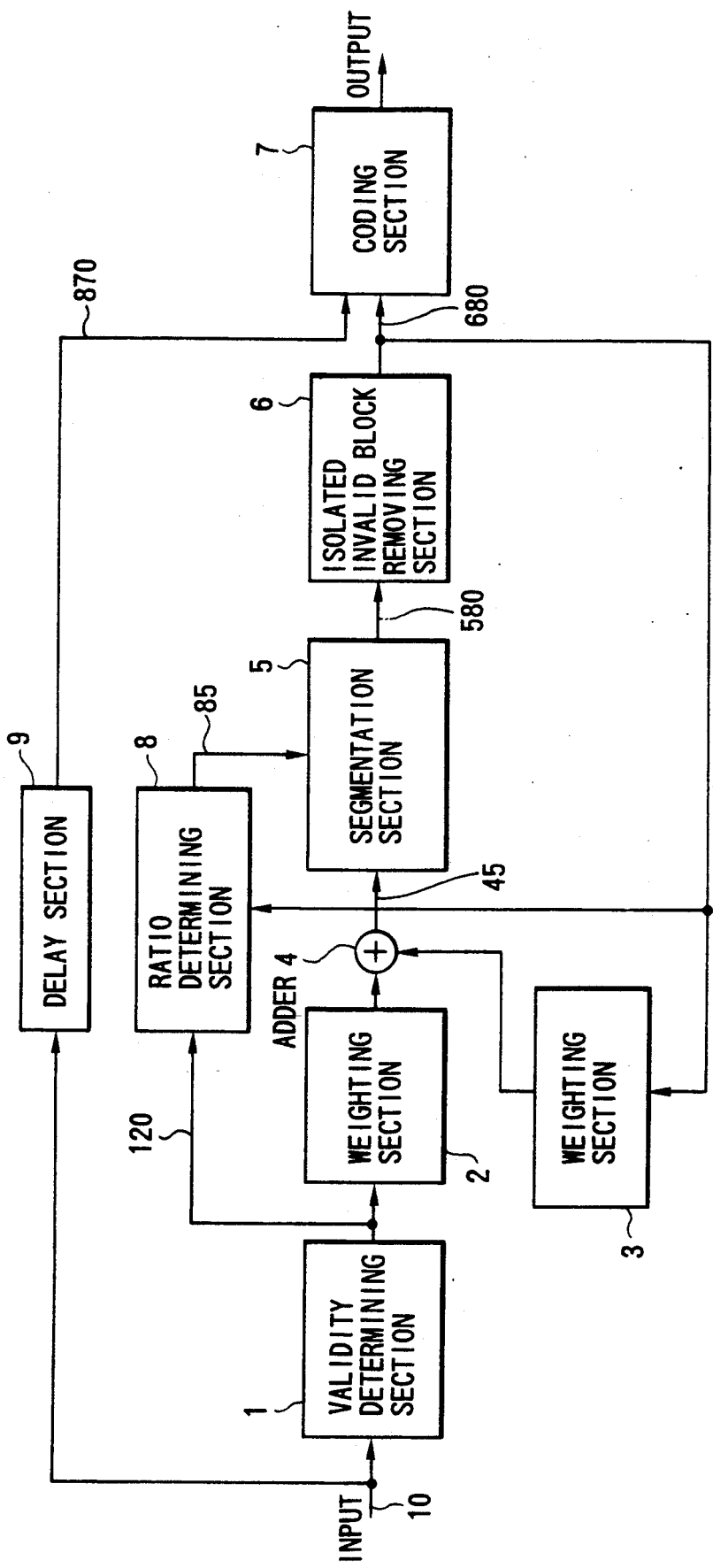
FIG. 11 is a block diagram showing an apparatus for coding a moving image signal according to the embodiment shown in FIGS. 8 to 10.

FIG. 11 shows an apparatus based on the difference detection scheme according to the embodiment shown in FIGS. 8 to 10. The same reference numerals in FIG. 11 denote the same parts as in FIG. 7, and a detailed description thereof will be omitted.

A ratio determining section 8 determines the ratio of a valid block count of the fourth valid block map of a previous frame supplied from an isolated invalid block removing section 6 to a valid block count of the first valid block map supplied from a validity determining section 1, and supplies to a segmentation section 5 a determination signal indicating whether the determination result is not less than a predetermined fourth threshold value or less than it. The segmentation section 5 performs segmentation processing of the all the block in the second valid block map supplied from an adder 4. If, for example, the determination signal supplied from the ratio determining section 8 indicates that the rate is equal to or larger than the fourth threshold value, the segmentation section 5 selects a second threshold value as a threshold value in segmentation. If the determination signal indicates that the rate is less than the fourth threshold value, the segmentation section 5 selects a fifth threshold value as a threshold value in segmentation, thus performing segmentation. Assume that a block k is a target block for segmentation, as shown in FIG. 5. In this case, the values of the block k and neighboring blocks a, b, c, d, e, f, g, and h are referred. If these values are equal to or larger than a threshold value selected by a determination signal supplied from the ratio determining section 8, it is determined that the block k is valid. If the values are less than the selected threshold value, it is determined that the block k is invalid. In this manner, the segmentation section 5 obtains a third valid block map. The third valid block map obtained by the segmentation section 5 is supplied to the isolated invalid block removing section 6. Subsequently, processing similar to those in the above-described embodiment is performed until coding is performed.

Figure 14:
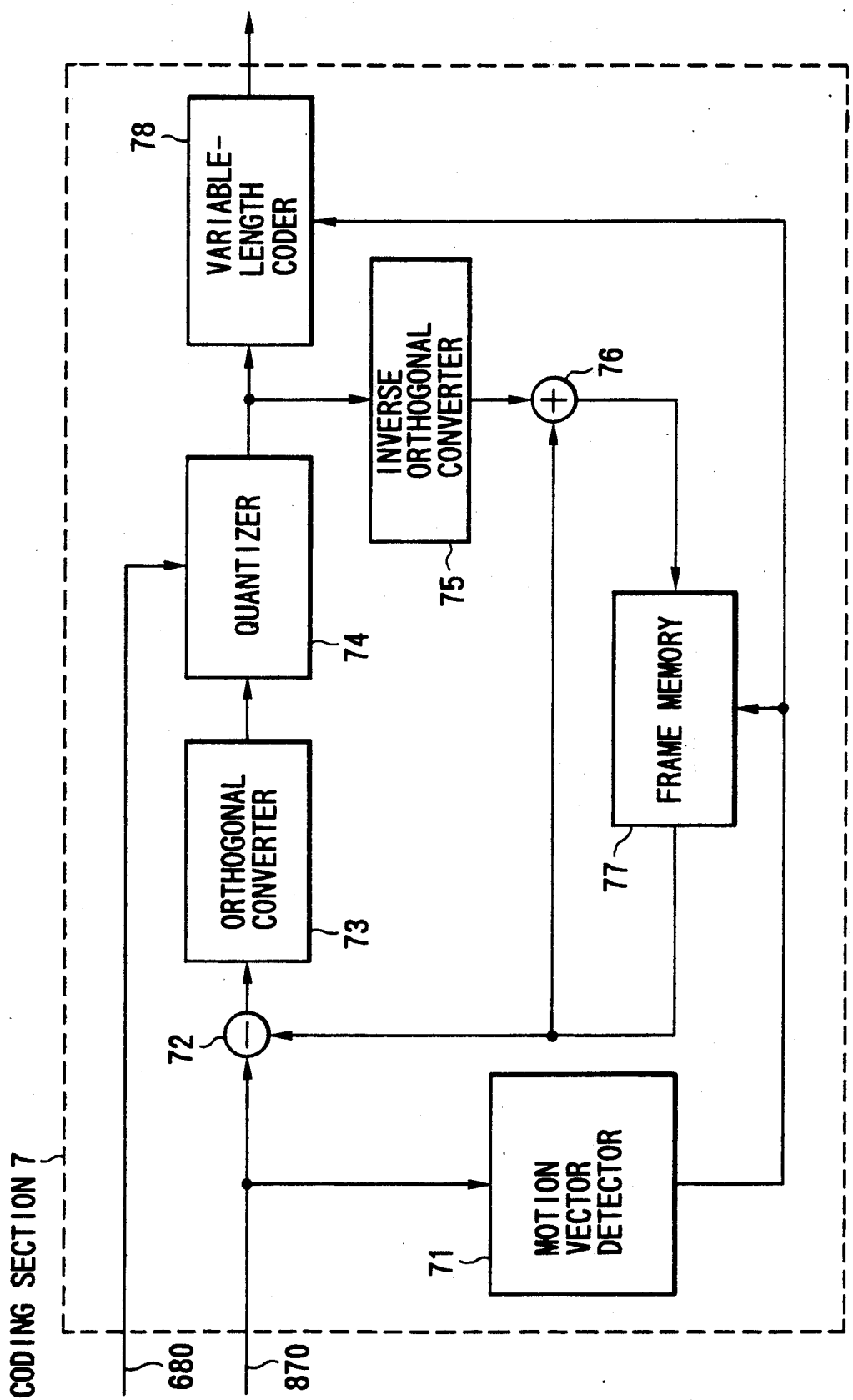

FIG. 12 shows an arrangement of the segmentation section 5. The segmentation section 5 can be constituted by line memories 50 and 51, delay circuits 52, 53, 54, 55, 56, and 57, and a ROM 58. The second valid block map output from the adder 4 is supplied to the line memory 50, the delay circuit 52, and the ROM 58 through a line 45. The line memory 50 delays the valid block map supplied through the line 45 by an amount corresponding to one block line, and supplies the delayed map to the line memory 51, the delay circuit 54, and the ROM 58. The line memory 51 delays the signal supplied from the line memory 50 by an amount corresponding to one block line, and supplies the delayed signal to the delay circuit 56 and the ROM 58. Each of the delay circuits 52, 53, 54, 55, 56, and 57 delays the supplied signal by one clock and supplies it to the ROM 58 and the next delay circuit. An output signal from the delay circuit 54 corresponds to the block k as a segmentation target block. The ROM 58 writes a value representing a valid block in an address area in which a signal supplied from one of the line memories or one of the delay circuits is equal to or larger than the second threshold value, and writes a value representing an invalid block in an address area in which the value of the supplied signal is smaller than the second threshold value. By using the line memories, the delay circuits, and the ROM in the above-described manner, the values of the segmentation target block k and the neighboring blocks can be referred, and the result can be output through a line 580. Note that a line 85 is a line through which a signal is supplied from a ratio determining section 9 in an apparatus shown in FIG. 33. The isolated invalid block removing section 6 will be described next with reference to FIG. 13. Similar to the segmentation section 5, the isolated invalid block removing section 6 comprises line memories 60 and 61, delay circuits 62, 63, 64, 65, 66, and 67, and a ROM 68. The isolated invalid block removing section 6 removes an isolated invalid block by referring to the values of blocks adjacent to the invalid block. A signal supplied from the delay circuit 64 to the ROM 68 corresponds to a target block k subjected to an isolated invalid block removing operation. If the signal supplied from the delay circuit 64 to the ROM 68 represents an invalid block, and the value of each neighboring block is equal to or larger than a third predetermined threshold value, the ROM 68 outputs a value representing a valid block. In contrast to this, if the signal supplied from the delay circuit 64 represents an invalid block, and the value of each neighboring block is less than the third threshold value, the ROM 68 outputs a value representing an invalid block. In addition, if the signal supplied from the delay circuit 64 represents a valid block, the ROM 68 outputs a value representing a valid block. The above-described logic is written in the ROM 68 in advance to remove isolated invalid blocks and link valid blocks to each other. The fourth valid block map output from the isolated invalid block removing section 6 is supplied to a weighting section 3 and a coding section 7 through a line 680. The weighting section 3 can be constituted by a ROM, similar to the weighting section 2. In this case, a value of second weighting is written in the ROM in advance. FIG. 14 shows the arrangement of the coding section 7. A moving image signal supplied from a delay circuit 8 to the coding section 7 through a line 870 is supplied to a motion vector detector 71 and a subtracter 72 in the coding section 7. The fourth valid block map output from the isolated invalid block removing section 6 is supplied, as a signal representing a region for which coding is executed, to a quantizer 74 through a line 687. The motion vector detector 71 stores the signal of a previous frame, and detects a motion between the signal of the previous frame and a new signal input through the line 870, thus supplying a motion vector representing the amount and direction of each motion to a frame memory 77 and a variable-length coder 78. The subtracter 72 performs a subtraction of the input signal supplied through the line 870 and a motion-compensated predictive signal supplied from the frame memory 77 to obtain a motion compensation predictive error signal. The motion compensation predictive error signal obtained by the subtracter 72 is supplied to an orthogonal converter 73. The orthogonal converter 73 performs orthogonal conversion of the motion compensation predictive error signal supplied from the subtracter 72 to convert the predictive error signal in a spatial region into a predictive error signal in a frequency region. The predictive error signal in the frequency region output from the orthogonal converter 73 is supplied to the quantizer 74. The quantizer 74 quantizes each predictive error signal, supplied from the orthogonal converter 73, which corresponds to a block indicated as a valid block by the fourth valid block map supplied through the line 687. With regard to a block indicated as an invalid block by the fourth valid block map supplied through the line 687, the quantizer 74 outputs "0" to stop coding. The output signal from the quantizer 74 is supplied to an inverse orthogonal converter 75 and the variable-length coder 78. The inverse orthogonal converter 75 performs inverse orthogonal conversion of the predictive error signal supplied from the quantizer 74 to convert it into the predictive error signal in the spatial region again. The output signal from the inverse orthogonal converter 75 is supplied to an adder 76. The adder 76 adds the predictive error signal in the spatial region, supplied from the inverse orthogonal converter 75, to the motion-compensated predictive signal supplied from the frame memory 77, thus obtaining a local decoded signal. The local decoded signal output from the adder 76 is supplied to the frame memory 77. The frame memory 77 changes the delay amount of the local decoded signal supplied from the adder 76 in accordance with the motion vectors supplied from the moving vector detector 71 to obtain a motion-compensated predictive signal. The motion-compensated predictive signal output from the frame memory 77 is supplied to the subtracter 72 and the adder 76. Subsequently, the variable-length coder 78 converts the quantized predictive error signal in the frequency region supplied from the quantizer 74 and the motion vectors supplied from the motion vector detector 71 into variable-length codes by using an efficient coding scheme such as Huffman coding, thus reducing the redundancy. The variable-length codes whose redundancy is reduced are output from the variable-length coder 78 to be output from the coding section 7 to a transmission line, while the coding rate and the speed of the transmission line are synchronized with each other.

With this operation, therefore, coding is performed with respect to only a valid block region, i.e., a speaker region, in accordance with the fourth valid block map, but coding is stopped with respect to a background portion indicated by an invalid block. Coding may be stopped by setting the output of the subtracter 72 at "0" level.

A method of extracting a speaker region according to still another embodiment will be described in detail below with reference to the accompanying drawings. Assume that a speaker moves as indicated by the frames at time t0, time t1, and time t2 in FIG. 15. The hatched regions shown in FIG. 16 correspond to the differences between the frames at time t0 and time t1. The isolated hatched portion in the background portion in FIG. 16 corresponds to a difference signal generated by noise in the background. FIG. 17B shows a valid block map at time t1 which is obtained by the same processing as described above. Each shaded portion in FIG. 17B is a valid block. FIG. 17A shows the sixth valid block map obtained between the frame at time t0 and the frame at time t0-1 immediately preceding the frame at time t0. The first weighting operation of the valid block map of the current frame (FIG. 17B), i.e., the first valid block is performed, whereas the second weighting operation of the valid block map of the previous frame (FIG. 17A), i.e., the sixth valid block map is performed. The weighted valid block maps of the current and previous frames are added/synthesized to obtain the second valid block map. FIG. 17C shows the second valid block map. Subsequently, segmentation is performed with respect to the second valid block map, as shown in FIGS. 17C and 5.

FIG. 17D shows the third valid block map obtained by the segmentation. If an isolated invalid block x shown in FIG. 18 is generated in the third valid block map, the region of the isolated invalid block is removed by the same processing as described above to obtain the fourth valid block map. FIG. 17D shows the fourth valid block map.

Processing at time t2 will be described below. When differences between the frames at time t1 and time t2 are obtained, and validity determination is performed in accordance with the first threshold value, the first valid block map shown in FIG. 19A is obtained. The first weighting operation of the first valid block map is performed. Since FIG. 17D shows the valid block map at time t1 as the previous frame, the second weighting operation of the valid block map in FIG. 17D is performed. When the weighted valid block map in FIG. 17D is added/synthesized using the first valid block map in FIG. 19B, for which the first weighting operation is performed, the second valid block map shown in FIG. 19B is obtained. When the above-mentioned segmentation is performed with respect to the second valid block map in FIG. 19B, the third valid block map shown in FIG. 19C is obtained. Subsequently, an isolated invalid block removing operation of the third valid block map is performed. Since no isolated invalid block is present in the third valid block in FIG. 19C, the third valid block map is used as the fourth valid block without any modification, thus obtaining a speaker region by segmentation. Although the actual speaker region at time t2 corresponds to substantially the left half of the frame, a large portion of the speaker region obtained by segmentation extends to the background portion in the right half of the frame. If, therefore, the fourth valid block map in FIG. 19C is used without any modification, noise in the background may be undesirably coded. That is, when the motion of a speaker is large as in the case of the frames at time t1 and time t2, and the number of valid blocks obtained by segmentation is large, the speaker region of the current frame extends into the speaker region of the previous frame due to the influences of the valid block map of the previous frame. For this reason, if the motion of a speaker between frames is large, i.e., the number of valid blocks in the fourth valid block map is equal to or larger than a fourth predetermined threshold value, all the valid blocks in the fourth valid block map are replaced with invalid blocks to obtain the fifth valid block map. The fifth valid block map is delayed by a one-frame time to become the sixth valid block map. At the next timing, the sixth valid block map is subjected to segmentation. Assume that FIGS. 17A and 17B respectively show the fourth block map of the previous frame and the valid block map of the current frame, i.e., the first valid block map. In this case, if the number of valid blocks in the fourth valid block map obtained at time t1 is equal to or larger than the fourth threshold value, all the valid blocks in the fourth valid block map are replaced with invalid blocks to obtain the fifth valid block map. Therefore, all the blocks in the sixth valid block map at time t2, which is obtained by delaying the fifth valid block map by a one-frame time, are invalid blocks. As a result, the weighted second valid block map shown in FIG. 19D is obtained, provided that the valid block map shown in FIG. 19A is the first valid block map at time t2. When the above-mentioned segmentation is performed with respect to this second valid block map, the third valid block map shown in FIG. 19A is obtained. Since no isolated invalid block is included in the third valid block map, the third valid block map is used as the fourth valid block map without any modification, thus omitting the background portion.

Figure 20:
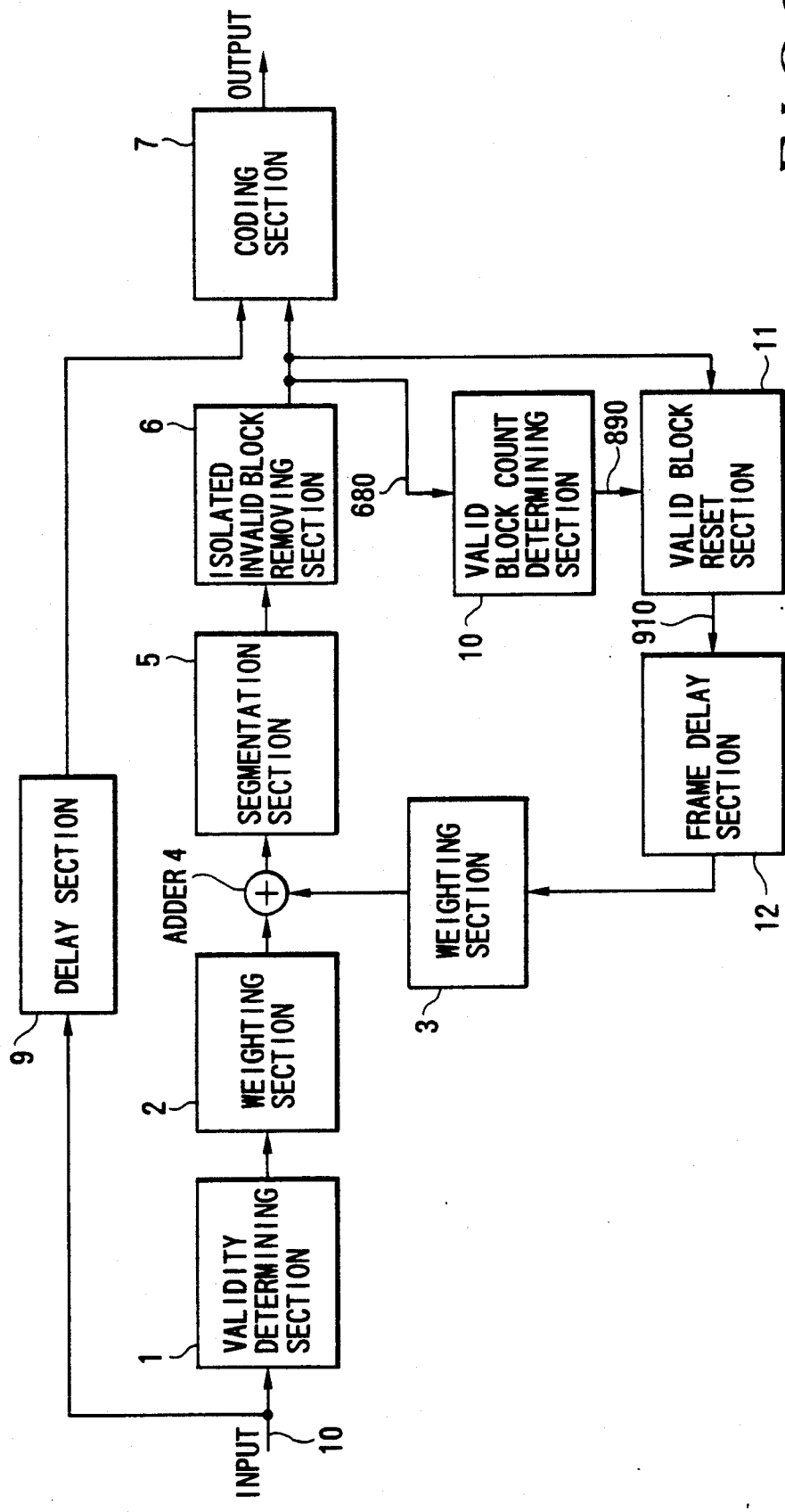
FIG. 20 is a block diagram showing an apparatus for coding a moving image signal according to the embodiment shown in FIGS. 15 to 19D.

FIG. 20 shows an apparatus based on the difference detection scheme according to the embodiment shown in FIGS. 15 to 19D. The same reference numerals in FIG. 20 denote the same parts as in FIG. 7, and a detailed description thereof will be omitted.

The fourth valid block map obtained by an isolated invalid block removing section 6 is supplied to a valid block count determining section 10, a valid block reset section 11, and a coding section 7. If the number of valid blocks in the fourth valid block map supplied from the isolated invalid block removing section 6 is equal to or larger than a fourth predetermined threshold value, the valid block count determining section 10 supplies a reset execution command to the valid block reset section 11. In contrast to this, if the number of valid blocks in the fourth valid block map supplied from the isolated invalid block removing section 6 is less than the fourth threshold value, the valid block count determining section 10 supplies a reset stop command to the valid block reset section 11. In response to the reset execution command from the valid block count determining section 10, the valid block reset section 11 replaces all the valid blocks in the fourth valid block map supplied from the isolated invalid block removing section 6 with invalid blocks, thus obtaining the fifth valid block map. In contrast to this, in response to the reset stop command from the valid block count determining section 10, the valid block reset section 11 performs no processing with respect to the fourth valid block map supplied from the isolated invalid block removing section 6 to use the fourth valid block map as the fifth valid block map without any modification. The fifth valid block map obtained by the valid block reset section 11 is supplied to a frame delay section 12. The frame delay section 12 delays the fifth valid block map supplied from the valid block reset section 11 by a one-frame time to obtain the sixth valid block map. The sixth valid block map obtained by the frame delay section 12 is supplied to a weighting section 3. The weighting section 3 performs the second weighting operation of the sixth valid block map supplied from the frame delay section 12, and supplies the weighted fourth valid block map to an adder 4.

FIG. 21 shows an arrangement of the valid block count determining section 8. The fourth valid block map obtained by the isolated invalid block removing section 6 is supplied to a counter 81 in the valid block count determining section 10 through a line 680. The counter 81 counts valid blocks in the fourth valid block map supplied from the isolated invalid block removing section 6, and supplies the valid block count to a comparator 82. The fourth threshold value used for threshold determination of a valid block count is supplied, as a fixed value, to the comparator 82 through a line 820. As the comparator 82, a general comparator such as an SN7485 available from Texas Instruments is used. If the valid block count supplied from the counter 81 is equal to or larger than the fourth threshold value supplied through the line 820, the comparator 82 outputs a signal designating reset execution. If the valid block count is less than the fourth threshold value, the comparator 82 outputs a signal designating a reset stop. The above-described logic is set in the comparator 82 in advance. An output signal from the comparator 82 is supplied, as an output from the valid block count determining section 10, to the valid block reset section 10 through a line 890. FIG. 22 shows an arrangement of the valid block reset section 11. The valid block reset section 11 is constituted by a selector 91. The fourth valid block map is supplied from the isolated invalid block removing section 6 to one input terminal of the selector 91 through the line 680. A value representing an invalid block is supplied to the other input terminal of the selector 91 through a line 920. Subsequently, a signal indicating whether the valid block count is not less than the fourth threshold value is supplied, as a selection signal, from the valid block count determining section 10 to the selector 91 through the line 890. If the selection signal supplied through the line 890 indicates that the valid block count is equal to or larger than the fourth threshold value, the selector 91 selects the signal representing the invalid block, which is supplied through the line 920. If the selection signal supplied through the line 890 indicates that the valid block count is less than the fourth threshold value, the selector 91 selects the fourth valid block map supplied through the line 680. An output signal from the selector 91 is supplied, as the fifth valid block map, to the frame delay section 12 through a line 910.

An apparatus based on the difference detection scheme according to the embodiment of FIGS. 15 to 19D will be described below with reference to FIG. 23.

The valid block reset section 11 is omitted from the apparatus of this embodiment, and a valid block reset function is assigned to a weighting section 103. A valid block count determining section 10 counts valid blocks in the fourth valid block map supplied from an isolated invalid block removing section 6, and performs threshold determination of the obtained valid block count by using the fourth threshold value, thus supplying to the weighting section 103 a signal indicating whether the valid block count is the fourth threshold value or more. The weighting section 103 performs the second weighting operation of the fifth valid block map supplied from a frame delay section 12 to obtain the sixth valid block map. If the determination signal supplied from the valid block count determining section 10 indicates that the valid block count is equal to or larger than the fourth threshold value, the weighting section 103 replaces all the valid blocks in the sixth valid block map with invalid blocks. In contrast to this, if the determination signal indicates that the valid block count is less than the fourth threshold value, the weighting section 103 outputs the sixth valid block map without any modification. The sixth valid block map output from the weighting section 103 is supplied to an adder 4.

Furthermore, in the present invention, a speaker region can be extracted by detecting the motion of the speaker between frames, and performing segmentation of a portion corresponding to the motion, instead of performing the above-described difference detection scheme. In this case, the motion of a speaker between two consecutive frames must be detected. As a method of detecting such a motion between two consecutive frames, a method based on the principle of motion compensation is available. For example, a method described by Ninomiya, et al., "Motion Compensation Inter-frame Coding Scheme", Shingakuron (B), J63- B, 11, pp. 1140-1147, November, 1976 is known. In this method, each frame is divided into small blocks. The image portions of the previous frame are stored in units of blocks. Blocks, of the current frame, which have the highest correlation with the respective image portions of the previous frame are calculated, and the differences in position (motion vectors) between the corresponding blocks, and the differences in amplitude (motion-compensated predictive errors) between pixels spatially located at the same position between the corresponding blocks are transmitted. The motion-compensated vectors may be obtained by a method other than the method described above.

A method of extracting a speaker region by using the above-mentioned motion-compensated vectors according to the present invention will be described in detail below with reference to the accompanying drawings. Assume that a speaker moves as indicated by the frames at time t0, time t1, and time t2 in FIG. 1. When the motion between the frames at time t1 and time t2 is compensated, motion vectors indicated by arrows in FIG. 24 are obtained. In this case, if the motion between the frames at time t2 and time t3 occurs mainly at a mouth portion, the motion vectors indicated by arrows in FIG. 25A are obtained. An isolated arrow portion in the background portion corresponds to a motion vector generated by noise in the background. A block in which a motion vector is generated is defined as a valid block, and a block in which no motion vector is generated is defined as an invalid block. FIGS. 3B and 25B respectively show a valid block map between time t1 and time t2 and a valid block map between time t2 and time t3, which are obtained by the above-described processing. Referring to FIGS. 3B and 25B, shaded portions represent valid blocks. Assume that FIG. 3A shows the fourth valid block map obtained between time t0 and time t1. The valid block map of the current frame, i.e., the first valid block map, is subjected to the first weighting operation, whereas the valid block map of the previous frame, i.e., the fourth valid block map, is subjected to the second weighting operation. The weighted valid block maps of the current and previous frames are added/synthesized to obtain the second valid block map. FIG. 4A shows the second valid block map at time t2, which is obtained by the above-descried weighting operations. Subsequently, segmentation of the second valid block map in FIG. 4A is performed. In the segmentation of the first coding method using motion vectors, valid and invalid blocks are determined by using the second threshold value, as described in the method based on the difference detection scheme.

In the second coding method using motion vectors, different segmentation operations are performed depending on whether the ratio of a valid block count of the previous frame, i.e., a valid block count of the fourth valid block map, as a denominator, to a valid block count of the valid block map of the current frame, i.e., a valid block count of the first valid block map, as a numerator, is not less than the fourth threshold value or less than it. If the valid block count is equal to or larger than the fourth threshold value, segmentation is performed by using the second threshold value in the same manner as in the first method.

FIG. 4B shows the third valid block map obtained by the above-described segmentation in the first and second methods of coding a moving image signal according to the present invention. In the third valid block map, an isolated invalid block may be generated. In this case, blocks adjacent to the isolated invalid block are referred. If the values of the neighboring blocks are equal to or larger than a third predetermined threshold value, the value of the isolated invalid block as a target is replaced with a value representing a valid block. With the above-described processing, the region corresponding to the isolated invalid block in FIG. 4B is removed to obtain the fourth valid block map. FIG. 6 shows the fourth valid block map from which the isolated invalid block is removed.

A segmentation operation in the second coding method according to the present invention will be described below with reference to FIGS. 6, 25, 26, and 27. Assume, in this case, that the ratio of a valid bock count of the previous frame to a valid block count of the current frame is less than the first threshold value, similar to the case at time t3. When the fourth valid block map obtained at time t2, shown in FIG. 6, and the first valid block map obtained at time t3, shown in FIG. 25B, are respectively subjected to the first and second weighting operations and are synthesized with each other, the second valid block map shown in FIG. 26A is obtained. When segmentation of the second valid block map is performed in accordance with the second threshold value, the third valid block map indicated by a shaded portion in FIG. 26B is obtained. Subsequently, an isolated invalid block removing operation of the third valid block map is performed in accordance with the fourth threshold value to obtain the fourth valid block map. In this case, since no isolated invalid block is present in the third valid block map obtained at time t3, the fourth valid block map is identical with the third valid block map. Subsequently, only a portion, of the moving image signal, which corresponds to the valid block region in the fourth valid block map is coded. However, as shown in FIG. 26B, the chest portion and upper right head portion of the speaker are omitted from the valid block region of the fourth valid block map. If, therefore, coding is performed in this state, non-coded regions may be formed at the chest portion and the head portion, and discontinuous portions may be formed in the speaker region of the coded image. This may deteriorate the coded image. For this reason, if the ratio of a valid block count of the previous frame to a valid block count of the current frame is less than the first threshold value, and the valid block count of the current frame is small, as in the case at time t3, the threshold value in segmentation is switched to prevent omissions from the speaker region. When, for example, segmentation is executed with respect to the weighted second valid block map shown in FIG. 26A, if the block k has a value other than "0", the threshold value in segmentation is set to be small enough to make the segmentation target block k valid. With this operation, the third valid block map shown in FIG. 27 can be obtained, and omissions from the speaker region can be prevented. The threshold value in this segmentation is defined as the fifth threshold value. As described above, if the ratio of a valid block count of the previous frame to a valid block count of the current frame is equal to or larger than the fourth threshold value, segmentation is performed by selecting the second threshold value. In contrast to this, if the ratio of a valid block count of the previous frame to a valid block count of the current frame is less than the fourth threshold value, and the valid block count of the current frame is much smaller than the valid block count of the previous frame, segmentation is performed by selecting the fifth threshold value. Subsequently, the moving image signal corresponding to the valid block region shown in FIG. 27, i.e., the speaker region, is coded by using either or both of inter-frame correlation and intra-frame correlation.

Figure 28:
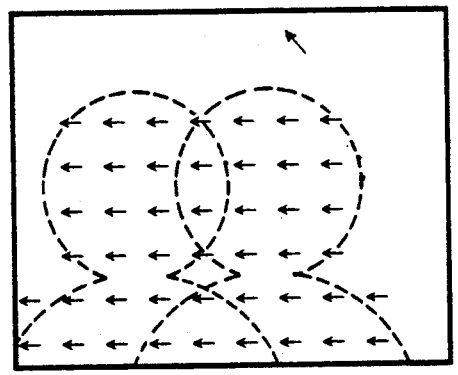

A method of extracting a speaker region in the third coding method using motion vectors will be described in detail below with reference to the accompanying drawings. Assume that a speaker moves as indicated by the frames at time t0, time t1, and time t2 in FIG. 1. When motion vectors between the frames at time t0 and time t1 are obtained, regions indicated by arrows in FIG. 28 is obtained. Assume, in this case, that the isolated arrow portion in the background portion is a motion vector generated by noise in the background, and that blocks in which motion vectors are generated are defined as valid blocks, and blocks in which no motion vectors are generated are defined as invalid blocks. FIG. 29B shows a valid block map at time t1, which is obtained by the above-described processing. Referring to FIG. 29B, shaded portions are valid blocks. Assume that FIG. 29A shows the sixth valid block map obtained between a frame at t0 and a frame at time t0−1 immediately preceding the frame at time t0. The first weighting operation is performed with respect to the valid block map (FIG. 29B) of the current frame, i.e., the first valid block map, whereas the second weighting operation is performed with respect to the valid block map (FIG. 29A) of the previous frame, i.e., the sixth valid block map. The weighted valid block maps of the previous and current frames are added/synthesized to obtain the second valid block map. FIG. 29C shows the second valid block map. Subsequently, segmentation of the synthesized second valid block map shown in FIG. 29C is performed.

Figure 30:
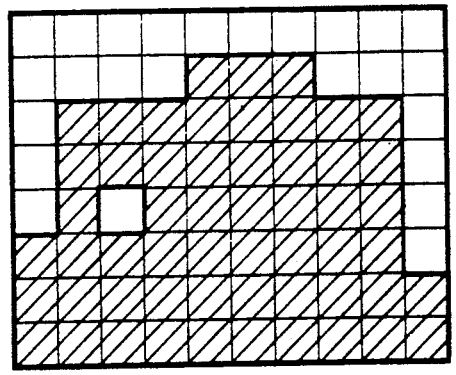

FIG. 29D shows the third valid block map obtained by segmentation. An isolated invalid block may be formed at a moving portion in the third valid block for the following reason. When the first valid block map is obtained, no motion vector is detected in a block whose difference value relative to a corresponding block of the previous frame is slightly smaller than the threshold value for motion vector detection, i.e., a block in which only a slight luminance change occurs and a simple pattern is formed. Such a block becomes an invalid block. As a result, an isolated invalid bock is sometimes formed at a moving portion. FIG. 30 shows a case wherein an isolated invalid block x is formed. The isolated invalid block x shown in FIG. 30 is removed by an isolated invalid block removing operation to obtain the fourth valid block map. Since no isolated invalid block is present in the third valid block map in FIG. 29D, the fourth valid block map is identical with the third valid block map shown in FIG. 29D.

Processing at time t2 will be described next.

FIG. 31A shows the first valid block map formed by obtaining motion vectors between frames at time t1 and time t2. The first weighting operation of the first valid block map is performed. The second weighting operation of the fourth valid block at time t1 shown in FIG. 29D is performed. When the first and fourth valid bock maps, which respectively have undergone the first and second weighting operations, are added/synthesized, the second valid block shown in FIG. 31B is obtained. When the above-described segmentation of the second valid block map in FIG. 31B is performed, the third valid block map shown in FIG. 31C is obtained. Subsequently, an isolated invalid block removing operation of the third valid block map is performed. Since no isolated invalid block is present in the third valid block map in FIG. 31C, the third valid block map is used as the fourth valid block. The shaded portion in the fourth valid block map is the speaker region obtained by segmentation. Although the actual speaker region at time t2 corresponds to substantially the left half of the frame, a large portion of the speaker region obtained by segmentation extends to the background portion in the right half of the frame. If, therefore, the fourth valid block map in FIG. 31C is used without any modification, noise in the background may be undesirably coded. That is, when the motion of a speaker is large as in the case of the frames at time t1 and time t2, and the number of valid blocks obtained by segmentation is large, the valid block region of the current frame extends into the speaker region of the previous frame due to the influences of the valid block map of the previous frame. If, therefore, the motion of the speaker between frames is large, i.e., the number of valid blocks in the fourth valid block map is equal to or larger than a third predetermined threshold value, a reset operation is performed with respect to the fourth valid block map to replace all the valid blocks in the fourth valid block map with invalid blocks to obtain the fifth valid block map. The fifth valid block map is delayed by a one-frame time to become the sixth valid block map. The six valid block map is subjected to segmentation at the next timing. Assume that FIG. 29A shows the fourth valid block map of the previous frame, and that FIG. 29B shows the valid block map of the current frame, i.e., the first valid block map. If the number of valid blocks in the fourth valid block map obtained at time t1 is equal to or larger than the fourth threshold value, all the valid blocks in the fourth valid block map are replaced with invalid blocks to obtain the fifth valid block map. Therefore, all the valid blocks in the sixth valid block map at time t2, which is obtained by delaying the fifth valid block may by a one-frame time, are replaced with invalid blocks. If the resulting first valid block map obtained at time t2 is the valid block map shown in FIG. 31A, the weighted second valid block map is the valid block map shown in FIG. 31D. If segmentation of this second valid block map is performed, the third valid block map shown in FIG. 31A can be obtained. Since no isolated invalid block is included in this third valid block map, the third valid block map becomes the fourth valid block map without any modification, thus removing the background portion.

Figure 32:
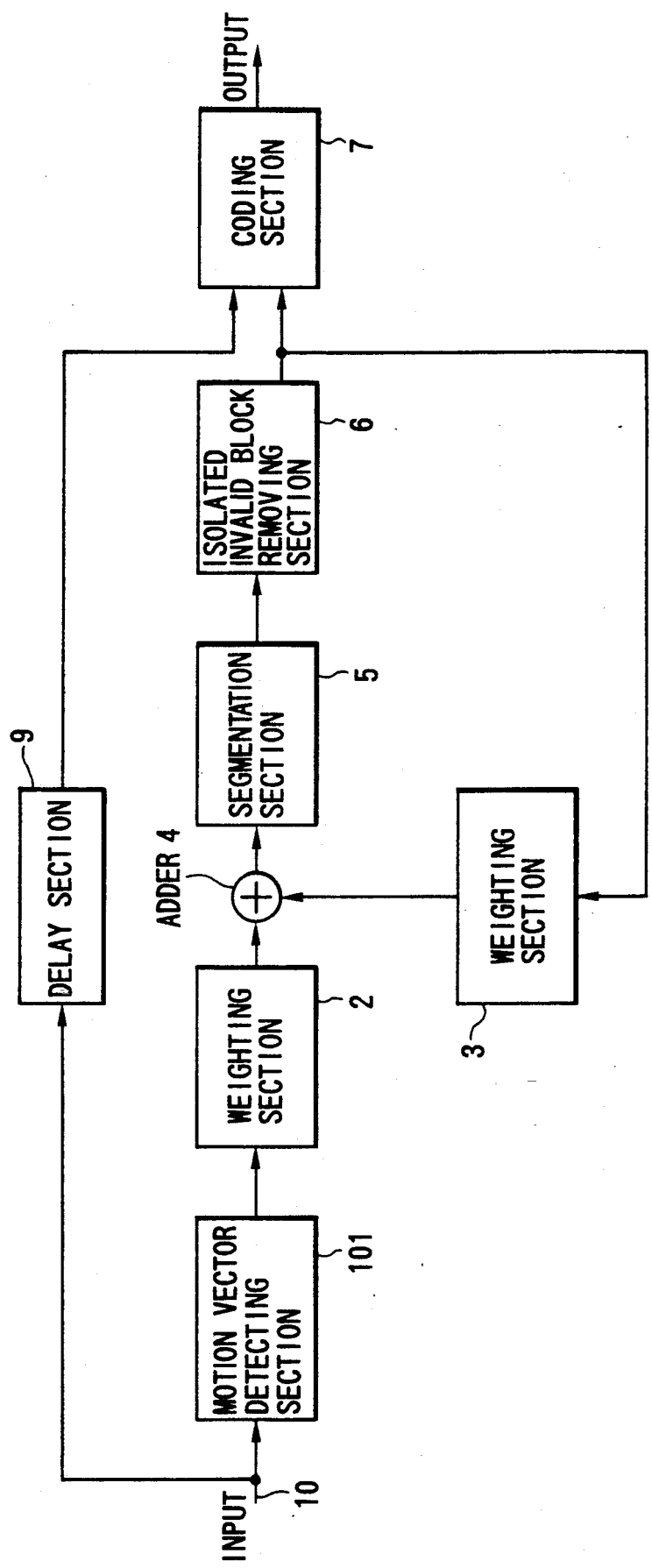
FIGS. 32 to 34 are block diagrams respectively showing apparatuses for coding a moving image signal according to the embodiment shown in FIGS. 24 to 31D.

FIG. 32 shows the first coding apparatus using motion vectors according to the embodiment of FIGS. 24 to 31D. The apparatus shown in FIG. 32 is identical with the apparatus in FIG. 7 except that a motion vector detecting section 101 is arranged in place of the validity determining section 1. The same reference numerals in FIG. 32 denote the same parts as in FIG. 7, and a description thereof will be omitted. An input moving image signal is supplied to the motion vector detecting section 101 and a delay section 9 through a line 10. The motion vector detecting section 101 stores the moving image signal of the previous frame, and divides the new moving image signal input through the line 10 into blocks, each consisting of a plurality of pixels, i.e., n horizontal pixels × n vertical pixels. In addition, the motion vector detecting section 101 calculates blocks having the highest correlation with the respective image portions of the previous frame stored in units of blocks, and obtains motion vectors representing the differences between the corresponding blocks. In this case, blocks in which motion vectors are generated are defined as valid blocks, whereas blocks in which no motion vectors are generated are defined as invalid blocks, thereby obtaining the first valid block map. The first valid block map obtained by the motion vector detecting section 101 is output to a weighting section 2.

Figure 33:
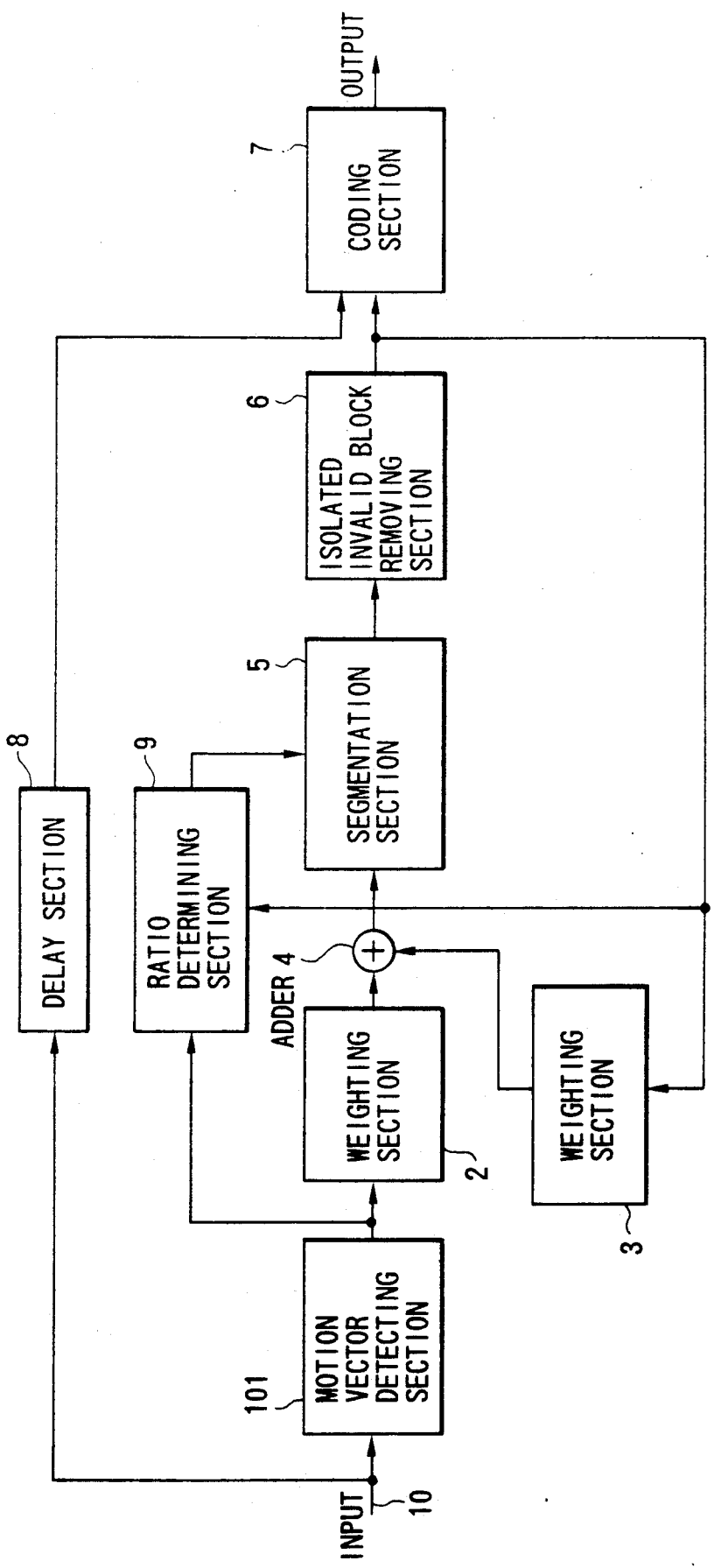

FIG. 33 shows the second coding apparatus using motion vectors according to this embodiment of the present invention. Similar to the apparatus shown in FIG. 32, the apparatus shown in FIG. 33 is obtained by replacing the validity determining section 1 of the apparatus shown in FIG. 11 with a motion vector detecting section 101. In this apparatus, operations subsequent to vector detection are performed in the same manner as in the apparatus shown in FIG. 11.

Figure 34:
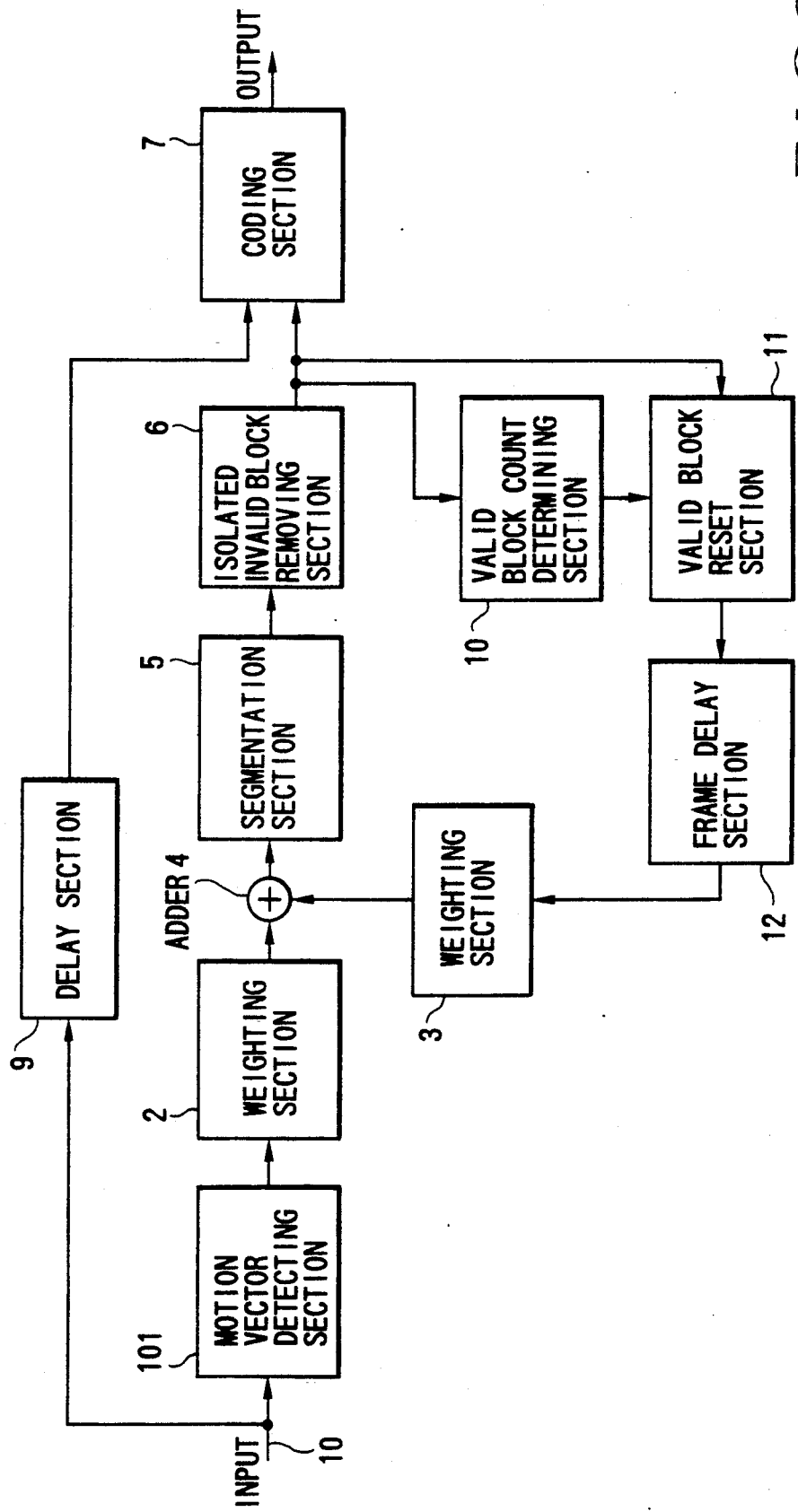

FIG. 34 shows the third coding apparatus using motion vectors according to this embodiment of the present invention. The apparatus shown in FIG. 34 is identical with the apparatus shown in FIG. 30 except that a motion vector detecting section 101 is arranged in place of the validity determining section 1.

Figure 35:
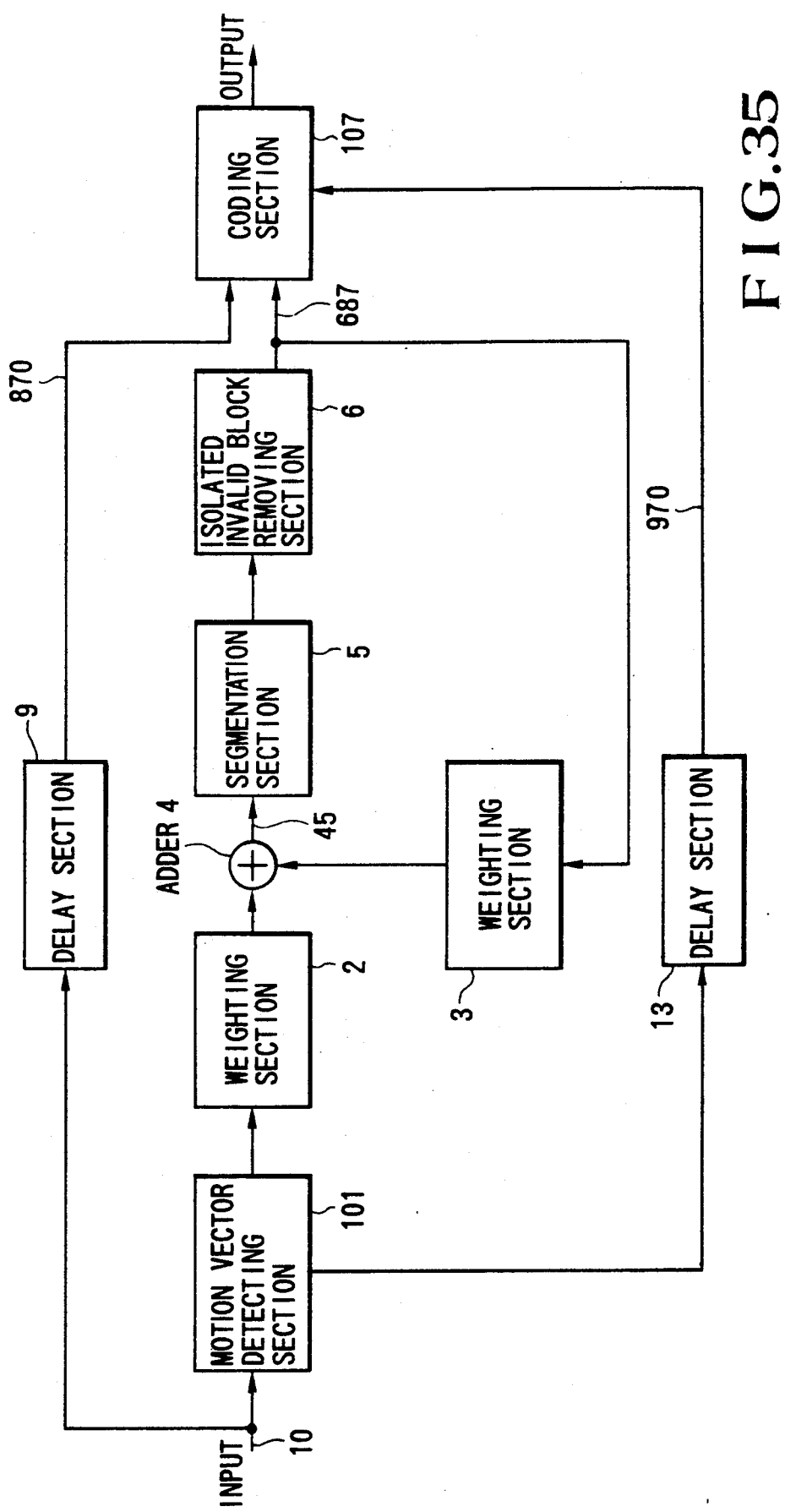
FIGS. 35, 37, 38, and 40 are block diagrams respectively showing modifications of the apparatus for coding a moving image signal according to the present invention.

FIG. 35 shows a modification of the apparatus using a motion vector, in which the arrangement of a coding unit 107 is simplified by adding a delay section 13. The delay section 13 performs delay compensation with respect to motion vectors supplied from a motion vector detecting section 101 to establish synchronization with the fourth valid block map. The time-compensated motion vectors output from the delay section 13 are supplied to the coding unit 107 through a line 970. As shown in FIG. 36, the motion vector detecting section 71 in FIG. 14 is omitted from the coding unit 107. In the coding unit 107, the motion vectors supplied from the delay section 13 through the line 970 are supplied a frame memory 77 and a variable-length coding unit 78.

Figure 37:
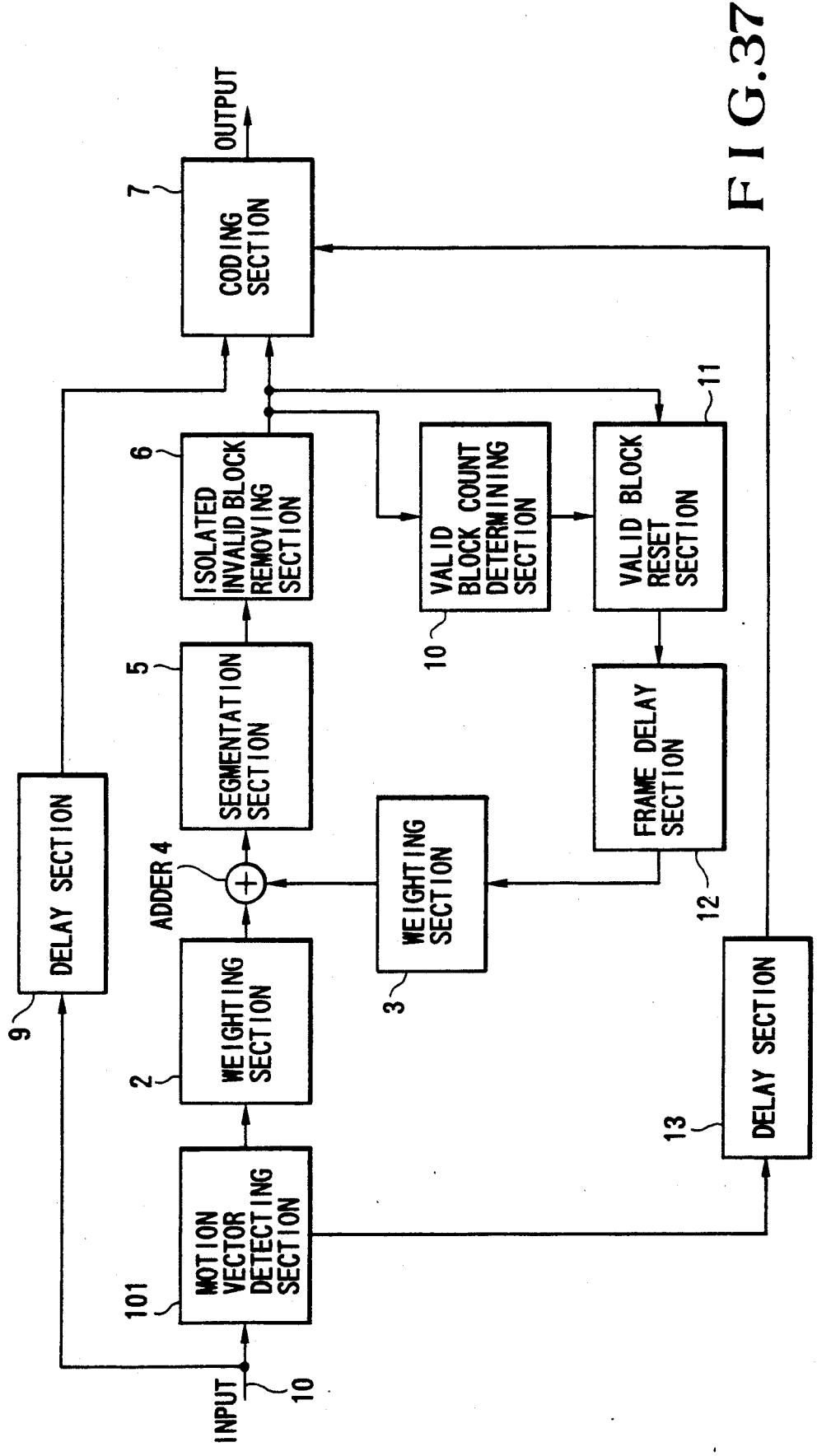

FIG. 37 shows a modification of the apparatus using the motion vectors, in which a delay section 13 is added to the apparatus shown in FIG. 34, and a coding unit 107 is used.

Figure 38:
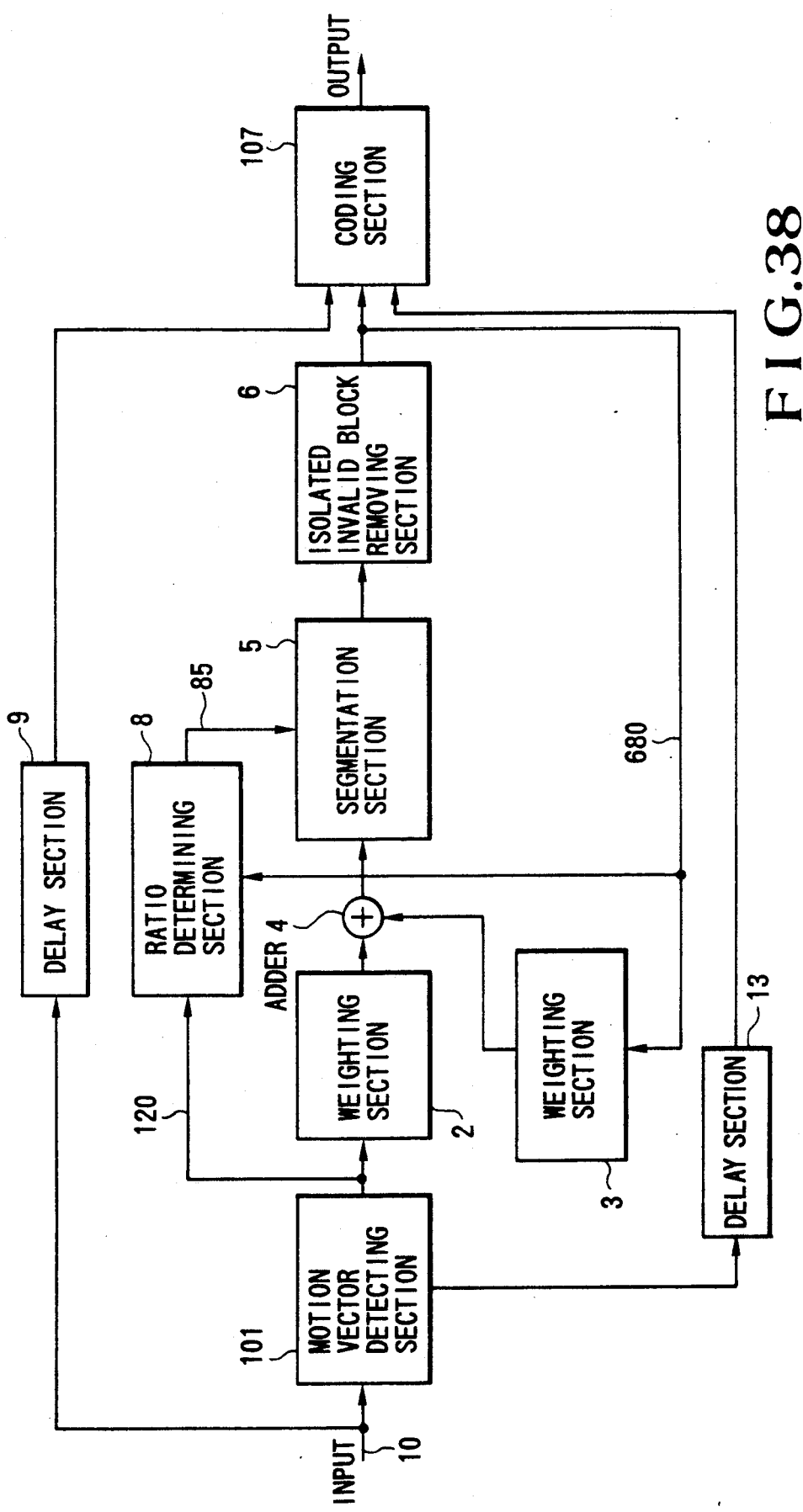

FIG. 38 shows a modification of the apparatus shown in FIG. 33.

Figure 23:
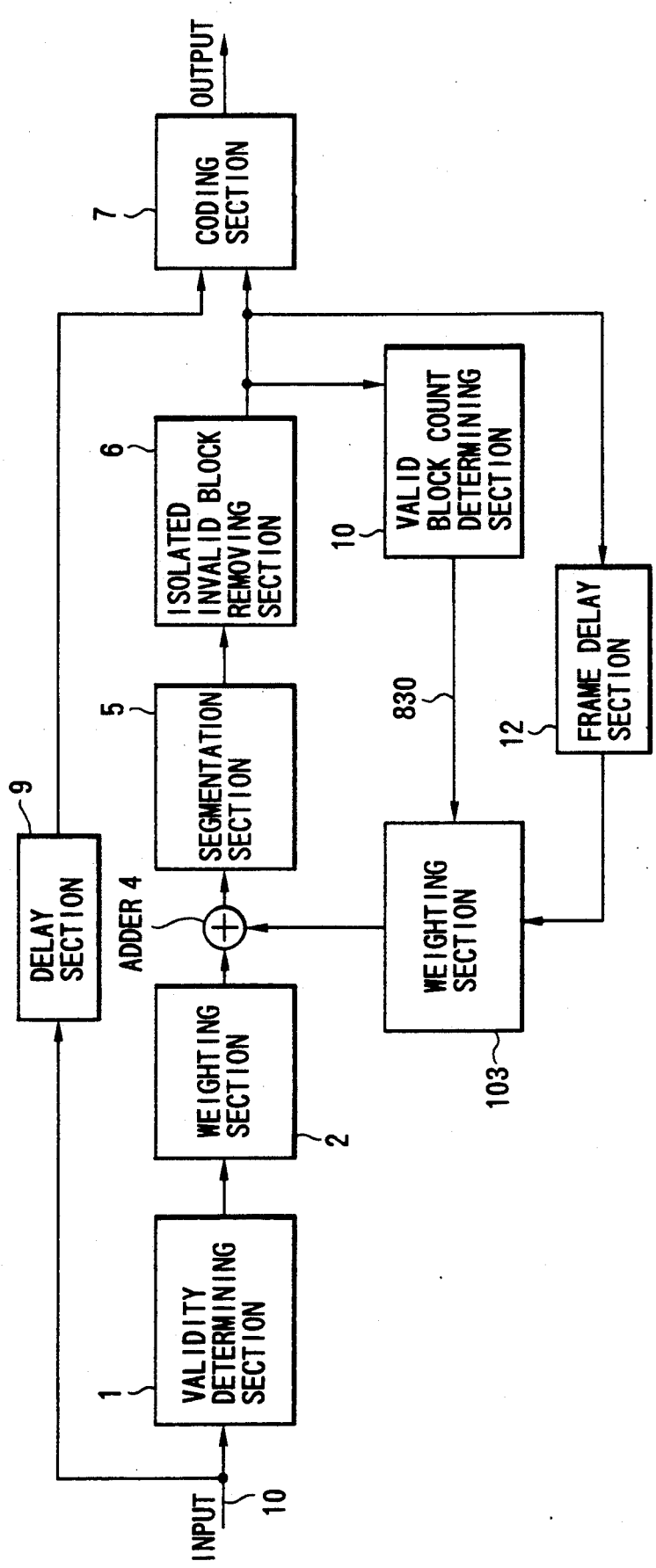
FIG. 23 is a block diagram showing an apparatus for coding a moving image signal according to the embodiment shown in FIGS. 15 to 19D.
Figure 27:
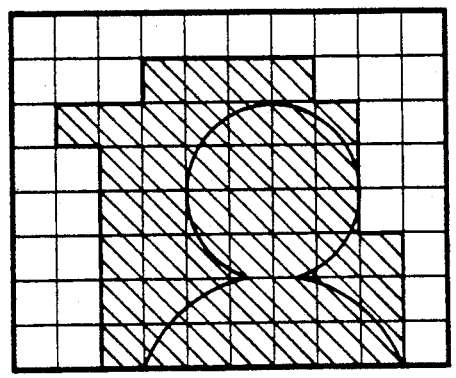
Figure 40:
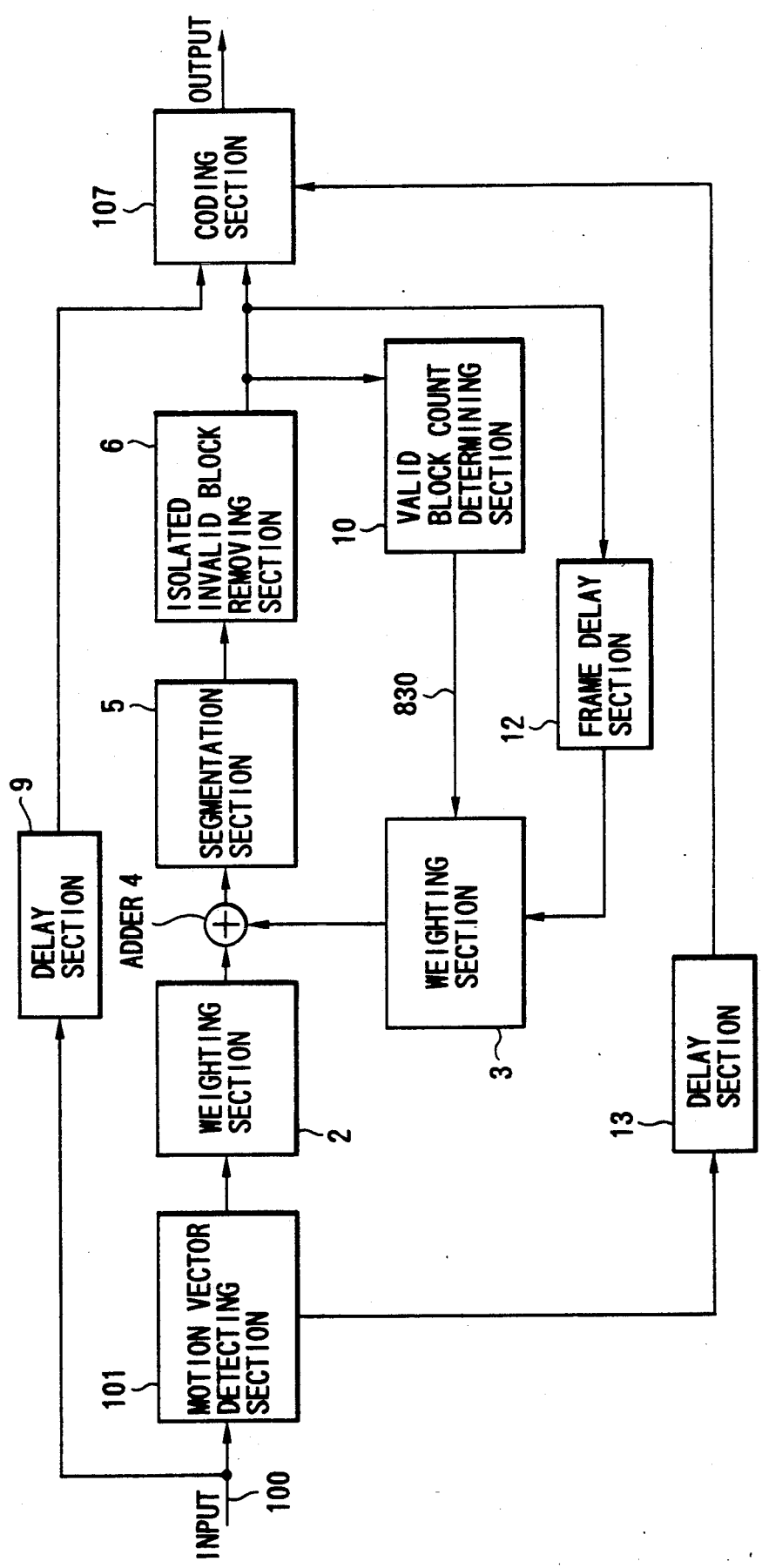

FIG. 40 shows a modification of the apparatus in FIG. 23, in which the validity determining section 1 in FIG. 23 is replaced with a motion vector detecting section 101, and a delay section 13 and a coding section 107 are used.

Figure 39:
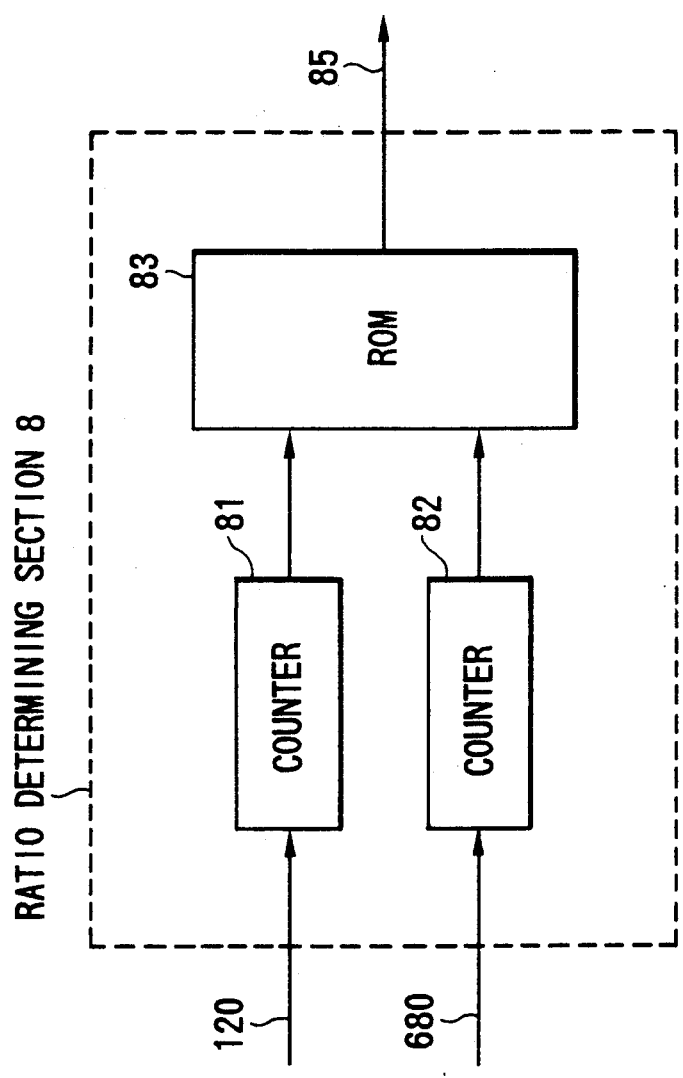
FIG. 39 is a block diagram showing a ratio determining section.

FIG. 39 shows an arrangement of the ratio determining section 8 shown in FIGS. 11, 33, and 38. The ratio determining section 8 is constituted by counters 81 and 82, and a ROM 83. The counter 81 of the ratio determining section 8 counts valid blocks in the first valid block map supplied from the motion vector detecting section 1 through a line 120. The counter 82 of the ratio determining section 8 counts valid blocks in the fourth valid block map supplied from the isolated invalid block removing section 6 through a line 680. Valid block count data output from the counters 81 and 82 are supplied to the ROM 83. The ROM 83 determines whether the ratio of the valid block count of the fourth valid block map to the valid block count of the first valid block count, which are obtained by the counters 81 and 82, is not less than a first predetermined threshold value. In the ROM 83, a value representing that the ratio of the valid block count of the fourth valid block map to the valid block count of the first valid block map is equal to or larger than the third threshold value is written beforehand in an address area in which the ratio is equal to or larger than the first threshold value, and a value representing that the ratio is less than the third threshold value is written beforehand in an address area in which the ratio is less than the first threshold value. A signal representing whether the ratio is not less than the first threshold value, which is output from the ROM 83, is supplied, as an output from the ratio determining section 8, to the segmentation section 5 through the line 85.

As has been described in detail above, in the method and apparatus for coding a moving image signal according to the present invention, since only a speaker region obtained by segmentation is coded, unnecessary information generated by noise in a background portion can be omitted, and the coding efficiency can be improved.

What is claimed is:

1. A method of coding a moving image signal, comprising the steps of:
    detecting a change between a current frame and a previous frame in units of blocks obtained by dividing a frame constituted by an input moving image signal into a plurality of pixels;
    forming a first valid block map in units of frames by determining valid and invalid blocks on the basis of the detected changes;
    performing a first weighting operation of the formed first valid block map;
    performing a second weighting operation of a fourth valid block map of the previous frame;
    obtaining a weighted second valid block map by adding/synthesizing the first and fourth valid block maps respectively subjected to the first and second weighting operations;
    obtaining a third valid block map by performing predetermined segmentation of the second valid block map;
    obtaining a fourth valid block map by determining validity of an isolated invalid block in the third valid block map by referring to neighboring blocks; and
    coding a valid block region of the fourth valid block map.

2. A method according to claim 1, further comprising the step of delaying the moving image signal by an amount corresponding to a time interval between the instant at which the moving image signal is input and the instant at which the fourth valid block map is formed, and wherein the step of coding is the step of coding the fourth valid block map of the delayed moving image signal.

3. A method according to claim 1, wherein a difference between the current and previous frames is detected as a detected change therebetween, and the first valid block map is formed such that if the detected difference is not less than a predetermined first threshold value, a corresponding block is defined as a valid block, and if the detected difference is less than the first threshold value, a corresponding block is defined as an invalid block.

4. A method according to claim 1, wherein a motion between the current and previous frames is detected as the detected change therebetween, and the first valid block map is formed such that a block in which a motion is detected is defined as a valid block, and a block in which no motion is detected is defined as an invalid block.

5. A method according to claim 1, wherein a motion vector representing the direction and magnitude of a motion between the current and previous frames is detected as the detected change therebetween in units of blocks, and the first valid block map is formed such that a block in which a motion vector is detected is defined as a valid block, and a block in which no motion vector is detected is defined as an invalid block.

6. A method according to claim 1, wherein the segmentation is performed such that if values of a target block and neighboring blocks are not less than a second predetermined threshold value, the target block is defined as a valid block, and if the values are less than the second threshold value, the target block is defined as an invalid block, thereby obtaining the third valid block map.

7. A method according to claim 1, wherein if values of blocks adjacent to the isolated invalid block in the third valid block map are not less than a third predetermined threshold value, the isolated invalid block is replaced with a valid block, and if the values are less than the third threshold value, the isolated invalid block is kept used as an invalid block.

8. A method according to claim 1, wherein the fourth valid block map is coded by using at least one of interframe correlation and intra-frame correlation.

9. A method according to claim 1, wherein the segmentation is performed to obtain the third valid block map on the basis of a ratio of a valid block count of the fourth valid block map to a valid block count of the first valid block map.

10. A method according to claim 9, wherein when the ratio between the valid block counts is not less than a fourth predetermined threshold value, if values of a target block and neighboring blocks are not less than a second predetermined threshold value, the target block is defined as a valid block, and if the ratio is less than the second threshold value, the target block is defined as an invalid block, thereby obtaining the third valid block map from the second valid block map.

11. A method according to claim 9, wherein when the ratio between the valid block counts is not less than a fourth predetermined threshold value, if values of a target block and neighboring blocks are not less than a fifth predetermined threshold value, the target block is defined as a valid block, and if the ratio is less than the fifth threshold value, the target block is defined as an invalid block, thereby obtaining the third valid block map from the second valid block map.

12. A method according to claim 1, wherein a fifth valid block map is obtained from the fourth valid block map on the basis of a valid block count of the fourth valid block map.

13. A method according to claim 12, wherein if the valid block count of the fourth valid block map is not less than a sixth predetermined threshold value, all valid blocks in the fourth valid block map are replaced with invalid blocks, thereby obtaining a fifth valid block map, and if the valid block count is less than the sixth threshold value, the fourth valid block map is used as a fifth valid block map without any modification.

14. A method according to claim 12, wherein the fifth valid block map is delayed by a one-frame time to obtain a sixth valid block map, and the second weighting operation of the sixth valid block map in place of the fourth valid block map is performed.

15. An apparatus for coding a moving image signal, comprising:
forming means for detecting a change between a current frame and a previous frame in units of blocks obtained by dividing a frame constituted by an input moving image signal into a plurality of pixels, and forming a first valid block map in units of frames by determining valid and invalid blocks on the basis of the detected changes;
first weighting means for performing a first weighting operation of the formed first valid block map;
second weighting means for performing a second weighting operation of a fourth valid block map of the previous frame;
adding means for obtaining a weighted second valid block map by adding/synthesizing outputs from said first and second weighting means;
segmentation means for obtaining a third valid block map by performing predetermined segmentation of the second valid block map;
isolated invalid block removing means for obtaining a fourth valid block map by determining validity of an isolated invalid block output from said segmentation means by referring to neighboring blocks; and
coding means for coding a valid block region output from said isolated invalid block removing means.

16. An apparatus according to claim 15, further comprising input signal delay means for delaying the input moving image signal to establish synchronization with the fourth valid block map, and wherein said coding means codes a valid block of an output from said input signal delay means.

17. An apparatus according to claim 15, wherein said forming means is validity determining means for detecting a difference between the current and previous frames, and forming the first valid block map such that if the detected difference is not less than a first predetermined threshold value, a corresponding block is defined as a valid block, and if the detected difference is less than the first threshold value, a corresponding block is defined as an invalid block.

18. An apparatus according to claim 15, wherein said forming means detects a motion between the current and previous frames, and forming the first valid block map such that a block in which a motion is detected is defined as a valid block, and a block in which no motion is detected is defined as an invalid block.

19. An apparatus according to claim 15, wherein said forming means is motion vector detecting means for detecting a motion vector representing the direction and magnitude of a motion between frames in units of blocks, and forming the first valid block map such that a block in which a motion vector is detected is defined as a valid block, and a block in which no motion vector is detected is defined as an invalid block.

20. An apparatus according to claim 15, wherein said segmentation means obtains the third valid block map such that if values of a target block and neighboring blocks are not less than a second predetermined threshold value, the target block is defined as a valid block, and if the values are less than the second threshold value, the target block is defined as an invalid block.

21. An apparatus according to claim 15, wherein said isolated invalid block removing means replaces the isolated invalid block with a valid block when values of neighboring blocks are not less than a third predetermined threshold value, and keeps the isolated invalid block to be an invalid block when the values are less than the third threshold value.

22. An apparatus according to claim 15, wherein said coding means performing a coding operation by using at least one of inter-frame correlation and intra-frame correlation.

23. An apparatus according to claim 15, further comprising ratio determining means for determining whether a ratio of a valid block count of the fourth valid block map to a valid block count of the first valid block map is not less than a fourth predetermined threshold value, and wherein said segmentation means obtains a third valid block map in accordance with an output from said ratio determining means.

24. An apparatus according to claim 23, wherein when the ratio between the valid block counts is not less than the fourth threshold value, said segmentation means obtains a third valid block map from the second valid block map such that if values of a target block and neighboring blocks are not less than a second predetermined threshold value, the target block is defined as a valid block, and if the values are less than the second threshold value, the target block is defined as an invalid block.

25. An apparatus according to claim 23, wherein when the ratio between the valid block counts is not less than the fourth threshold value, said segmentation means obtains a third valid block map from the second valid block map such that if values of a target block and neighboring blocks are not less than a fifth predetermined threshold value, the target block is defined as a valid block, and if the values are less than the fifth threshold value, the target block is defined as an invalid block.

26. An apparatus according to claim 15, further comprising valid block count determining means for determining whether a valid block count of the fourth valid block map is not less than a sixth predetermined threshold value, and valid block reset means for obtaining a fifth valid block map from the fourth valid block map on the basis of an output from said valid block count means.

27. An apparatus according to claim 26, wherein said valid block reset means replaces all valid blocks in the fourth valid block map with invalid blocks when the valid block count of the fourth valid block map is not less than the sixth threshold value to obtain a fifth valid block map, and sets the fourth valid block map as a fifth valid block map without any modification when the valid block count is less than the sixth threshold value.

28. An apparatus according to claim 26, further comprising frame delay means for obtaining a sixth valid block map by delaying the fifth valid block map by a one-frame time, and wherein said second weighting means performs the second weighting operation of the sixth valid block map in place of the second valid block map.

29. An apparatus according to claim 15, further comprising valid block count determining means for determining whether a valid block count of the fourth valid block map is not less than a sixth predetermined threshold value, and frame delay means for obtaining a fifth valid block map by delaying the fourth valid block map by a one-frame time, and wherein said second weighting means is means for supplying a sixth valid block map obtained by performing a reset operation of the fifth valid block map on the basis of an output from said valid block count determining means after the fifth valid block map from said frame delay means is weighted.

30. An apparatus according to claim 19, further comprising motion vector delay means for delaying a motion vector from said motion vector detecting means to establish synchronization with the fourth valid block map.

* * * * *